United States Patent
Lee et al.

(10) Patent No.: US 9,899,918 B2
(45) Date of Patent: Feb. 20, 2018

(54) DC/DC CONVERTER, DRIVING METHOD THEREOF, AND POWER SUPPLY USING THE SAME

(71) Applicant: Samsung Electronics Co., Ltd., Suwon-si (KR)

(72) Inventors: Kwang-chan Lee, Hwaseong-si (KR); Sung-woo Lee, Suwon-si (KR); Sang-hee Kang, Hwaseong-si (KR); Jung-wook Heo, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 4 days.

(21) Appl. No.: 15/004,337

(22) Filed: Jan. 22, 2016

(65) Prior Publication Data

US 2016/0315539 A1  Oct. 27, 2016

(30) Foreign Application Priority Data

Apr. 24, 2015 (KR) .................. 10-2015-0058268

(51) Int. Cl.
*H02M 3/158* (2006.01)
*H02M 1/088* (2006.01)
*H02M 1/00* (2006.01)

(52) U.S. Cl.
CPC ........... *H02M 3/158* (2013.01); *H02M 1/088* (2013.01); *H02M 2001/0009* (2013.01)

(58) Field of Classification Search
CPC ............... H02M 3/158; H02M 1/088; H02M 2001/0009; H02M 3/07; H02M 2003/072
See application file for complete search history.

(56) References Cited

U.S. PATENT DOCUMENTS 4,687,954 A * 8/1987 Yasuda ............. H03K 3/3565
                                                    327/206
5,517,401 A * 5/1996 Kinoshita ......... B60L 11/1803
                                                    363/132

(Continued)

FOREIGN PATENT DOCUMENTS

| EP | 2309638 | 4/2011 |
| WO | 2012074967 | 6/2012 |
| WO | 2014088551 | 6/2014 |

OTHER PUBLICATIONS

Reusch, David Clayton. "High Power Density Integrated Point of Load and Bus Converters", Dissertation submitted to Virginia Polytechnic Institute and State University, Apr. 6, 2012.

(Continued)

*Primary Examiner* — Jue Zhang
*Assistant Examiner* — Lakaisha Jackson
(74) *Attorney, Agent, or Firm* — Onello & Mello, LLP

(57) ABSTRACT

In a DC/DC converter, a driving method thereof, and a power supply using the same, the DC/DC converter includes a plurality of power switches connected as a serial string between an input terminal and a ground terminal, a first capacitor connected to at least two power switches of the serial string in parallel, an inductor connected between an intermediate node of the serial string and an output terminal, a second capacitor connected between the output terminal and the ground terminal, and a plurality of drivers configured to generate a switching control signal for each of the plurality of power switches. A voltage having no correlation with a voltage of the input terminal is supplied to a power terminal of each of the plurality of drivers.

20 Claims, 20 Drawing Sheets

(56) References Cited

U.S. PATENT DOCUMENTS

| | | |
|---|---|---|
| 7,061,777 B2 | 6/2006 | Zeng et al. |
| 7,701,189 B2 | 4/2010 | Gehrke |
| 8,212,537 B2 * | 7/2012 | Carpenter ............ H02M 3/158 323/222 |
| 8,305,059 B2 | 11/2012 | Al-Shyoukh |
| 8,593,125 B1 | 11/2013 | Xue |
| 8,724,353 B1 * | 5/2014 | Giuliano ................ H02M 3/07 327/536 |
| 9,318,952 B2 * | 4/2016 | Oraw ..................... H02M 3/07 |
| 2011/0001462 A1 | 1/2011 | Couleur et al. |
| 2012/0218785 A1 | 8/2012 | Li et al. |
| 2014/0003095 A1 | 1/2014 | Thomas et al. |
| 2014/0111016 A1 | 4/2014 | He et al. |
| 2014/0306674 A1 * | 10/2014 | Kondou ............... H02M 3/158 323/271 |
| 2015/0188434 A1 * | 7/2015 | Ouyang ............... H02M 3/158 323/267 |
| 2016/0254689 A1 * | 9/2016 | Lee ..................... H02M 3/158 320/107 |

OTHER PUBLICATIONS

Kim et al. "A Fully-Integrated 3-Level DC-Dc Converter for Nanosecond-Scale DVFS", IEEE Journal of Solid-State Circuits, vol. 47, No. 1, Jan. 2012.

Nattarasu, "Implementation of Five Level Buck Converter for High Voltage Application", International Journal of Engineering and Innovative Technology (IJESIT), vol. 3, Issue 4, Jul. 2014.

Yousefzadeh et al. "Three-Level Buck Converter for Envelope Tracking Applications", IEEE Transactions on Power Electronics, vol. 21, No. 2, Mar. 2006.

* cited by examiner

FIG. 2

|    | M11 | M12 | M13 | M14 | VX    |
|----|-----|-----|-----|-----|-------|
| S1 | ON  | ON  | OFF | OFF | VIN   |
| S2 | OFF | ON  | OFF | ON  | VIN/2 |
| S3 | ON  | OFF | ON  | OFF | VIN/2 |
| S4 | OFF | OFF | ON  | ON  | GND   |

DC/DC CONVERTER, DRIVING METHOD THEREOF, AND POWER SUPPLY USING THE SAME

CROSS-REFERENCE TO RELATED APPLICATION

This application claims priority under 35 U.S.C. § 119 to Korean Patent Application No. 10-2015-0058268, filed on Apr. 24, 2015, the entire contents of which are incorporated herein by reference in their entirety.

BACKGROUND

1. Technical Field

Inventive concepts relate to a DC/DC converter and a driving method thereof, and more particularly, to a DC/DC converter, a driving method thereof, and a power supply using the same.

2. Description of Related Art

Generally, switching regulators are apparatuses that convert power, which is input from an external source, to direct current (DC) power necessary for a system by using a plurality of power switches. Examples of switching regulators include DC/DC converters and/or the like for boosting or dropping input DC power. A plurality of power switches configuring a DC/DC converter may stably operate for enhancing performance of a system.

SUMMARY

The inventive concepts provide a DC/DC converter which efficiently manages power of a driver driving a plurality of power switches, thereby reducing damage to the power switches.

The inventive concepts provide a power supply which efficiently manages power of a driver driving a plurality of power switches included in a DC/DC converter, thereby reducing damage to the power switches.

The inventive concepts provide a method of driving a DC/DC converter for stably driving a plurality of power switches included in the DC/DC converter.

According to an aspect of the inventive concepts, there is provided a DC/DC converter including a plurality of power switches connected as a serial string between an input terminal and a ground terminal, a first capacitor connected to at least two power switches of the serial string in parallel, an inductor connected between an intermediate node of the serial string and an output terminal, a second capacitor connected between the output terminal and the ground terminal, and a plurality of drivers configured to generate a switching control signal for each of the plurality of power switches, wherein a voltage having no correlation with a voltage of the input terminal is supplied to a power terminal of each of the plurality of drivers.

The first capacitor may be connected between a first node and a second node of the serial string, the first node may be located between the intermediate node of the serial string and the input terminal, and the second node may be located between the intermediate node of the serial string and the ground terminal.

The plurality of power switches may include a plurality of high-side p-type metal-oxide-semiconductor (PMOS) transistors connected between the input terminal and the intermediate node of the serial string, and a plurality of low-side n-type metal-oxide-semiconductor (NMOS) transistors connected between the intermediate node of the serial string and the ground terminal.

The plurality of drivers may include a plurality of high-side drivers configured to respectively generate switching control signals for the plurality of high-side PMOS switches, and a plurality of low-side drivers configured to respectively generate switching control signals for the plurality of low-side NMOS transistors, and a negative source voltage supplied to at least one driver of the plurality of high-side drivers and a positive source voltage supplied to at least one driver of the plurality of low-side drivers may be constant voltages that are different from each other.

The negative source voltage supplied to at least one driver of the plurality of high-side drivers may be determined as a constant voltage that is lower than a voltage obtained by subtracting a source-gate voltage, which is used to turn on at least one of the plurality of high-side PMOS transistors, from a voltage of the input terminal.

The positive source voltage supplied to at least one driver of the plurality of low-side drivers may be determined as a constant voltage which is higher than a voltage obtained by adding a gate-source voltage, which is used to turn on at least one of the plurality of low-side NMOS transistors, to a voltage of the ground terminal.

The plurality of power switches may include a first PMOS transistor, a second PMOS transistor, a first NMOS transistor, and a second NMOS transistor, and a source terminal of the first PMOS transistor may be connected to the input terminal, a drain terminal of the first PMOS transistor is connected to a first node, a source terminal of the second PMOS transistor is connected to the first node, a drain terminal of the second PMOS transistor is connected to the intermediate node, a drain terminal of the first NMOS transistor is connected to the intermediate node, a source terminal of the first NMOS transistor is connected to a second node, a drain terminal of the second NMOS transistor is connected to the second node, and a source terminal of the second NMOS transistor is connected to the ground terminal. The first capacitor may be connected between the first node and the second node, and the plurality of drivers may include first to fourth drivers configured to respectively generate gate control signals for the first and second PMOS transistors and the first and second NMOS transistors.

A positive source voltage terminal of the first driver may be connected to the input terminal, a first constant voltage may be supplied to a negative source voltage terminal of the first driver, and the first constant voltage may be determined as a constant voltage that is lower than a voltage obtained by subtracting a source-gate voltage, which is used to turn on the first PMOS transistor, from a voltage of the input terminal.

A positive source voltage terminal of the second driver may be connected to the first node, a third capacitor may be connected between the positive source voltage terminal of the second driver and the first node, and a first diode may be connected between the positive source voltage terminal of the second driver and a negative source voltage terminal of the first driver.

A fourth capacitor may be connected between a positive source voltage terminal of the third driver and the second node, a second diode may be connected between the positive source voltage terminal of the third driver and a positive source voltage terminal of the fourth driver, and a negative source voltage terminal of the third driver may be connected to the second node.

A second constant voltage may be supplied to a positive source voltage terminal of the fourth driver, and the second constant voltage may be determined as a constant voltage that is higher than a voltage obtained by adding a gate-source voltage, which is used to turn on the second NMOS transistor, from a voltage of the ground terminal.

According to another aspect of the inventive concepts, there is provided a power supply including a feedback circuit configured to generate a first error signal and a second error signal, based on a difference between at least two feedback signals and at least one reference source, a controller configured to generate a plurality of control signals for making one of an output voltage, an output current, and an input current converge on a target value, based on the first error signal and the second error signal, and a DC/DC converter configured to change a path of a current, flowing to at least one inductor and capacitor which are included in a circuit between an input terminal and an output terminal, to generate the output voltage and the at least two feedback signals, based on the plurality of control signals, the DC/DC converter including a plurality of power switches connected as a serial string between the input terminal and a ground terminal and a plurality of drivers configured to generate a switching control signal for each of the plurality of power switches, wherein a voltage having no correlation with a voltage of the input terminal is supplied to a power terminal of each of the plurality of drivers.

The feedback circuit may include a 1Ath amplifier configured to generate the first error signal corresponding to a difference between the reference source and the output voltage detected from the output terminal, a second amplifier configured to generate a first signal corresponding to a voltage difference between a first node and a second node included in the serial string, and a 3Ath amplifier configured to generate the second error signal corresponding to a voltage difference between the first signal and the input voltage applied to the input terminal.

The feedback circuit may include a 1Bth amplifier configured to generate the first error signal corresponding to a difference between the reference source and the output current detected between the output terminal and a load circuit, a second amplifier configured to generate a first signal corresponding to a voltage difference between a first node and a second node included in the serial string, and a third amplifier configured to generate the second error signal corresponding to a voltage difference between the first signal and the input voltage applied to the input terminal.

The feedback circuit may include a 1Cth amplifier configured to generate the first error signal corresponding to a difference between the reference source and the input current detected from the input terminal, a second amplifier configured to generate a first signal corresponding to a voltage difference between a first node and a second node included in the serial string, and a third amplifier configured to generate the second error signal corresponding to a voltage difference between the first signal and the input voltage applied to the input terminal.

The controller may include an adder configured to generate a first signal corresponding to a sum of the first error signal and the second error signal, a subtractor configured to generate a second signal corresponding to a difference between the first error signal and the second error signal, a first comparator configured to compare the first signal with a first triangular wave signal to generate a first control signal and a fourth control signal, and a second comparator configured to compare the second signal with a second triangular wave signal to generate a second control signal and a third control signal, the first triangular wave signal having a 180-degree phase difference with the second triangular wave signal.

The power supply may further include a plurality of level shifters configured to respectively shift levels of the plurality of control signals, wherein output signals of the plurality of level shifters may be respectively supplied to input terminals of the plurality of drivers, and a source voltage of each of the plurality of level shifters may be applied as a source voltage that is the same as a source voltage of a corresponding driver.

The power supply may further include a regulator circuit configured to generate a source voltage supplied to at least one driver of the plurality of drivers, wherein the regulator circuit may include a first voltage regulator configured to generate a first source voltage through a first terminal a second voltage regulator configured to generate a second source voltage through a second terminal, a third capacitor connected between the first terminal and the input terminal, a first diode connected between the first terminal and a third node, a fourth capacitor connected between the third node and a first node included in the serial string, a fifth capacitor connected between the second terminal and the ground terminal, a second diode connected between the second terminal and a fourth node, and a sixth capacitor connected between the fourth node and a second node included in the serial string. The first terminal may be connected to a negative source voltage terminal of a first driver, the second terminal may be connected to a positive source voltage terminal of a fourth driver, the third node may be connected to a negative source voltage terminal of a second driver, and the fourth node may be connected to a positive source voltage terminal of a third driver.

The plurality of power switches may include a first PMOS transistor, a second PMOS transistor, a first NMOS transistor, and a second NMOS transistor, and a source terminal of the first PMOS transistor may be connected to the input terminal, a drain terminal of the first PMOS transistor is connected to the first node, a source terminal of the second PMOS transistor is connected to the first node, a drain terminal of the second PMOS transistor is connected to an intermediate node, a drain terminal of the first NMOS transistor is connected to the intermediate node, a source terminal of the first NMOS transistor is connected to a second node, a drain terminal of the second NMOS transistor is connected to the second node, and a source terminal of the second NMOS transistor is connected to the ground terminal. A positive source voltage terminal of the first driver may be connected to the input terminal, a positive source voltage terminal of the second driver is connected to the first node, a negative source voltage terminal of the third driver is connected to the second node, and a negative source voltage terminal of the fourth driver is connected to the ground terminal, and output terminals of the first to fourth drivers may be respectively connected to gate terminals of the first and second PMOS transistors and the first and second NMOS transistors.

According to another aspect of the inventive concepts, there is provided a method of driving a DC/DC converter, including a plurality of power switches that are connected as a serial string between an input terminal and a ground terminal and include a first PMOS transistor, a second PMOS transistor, a first NMOS transistor, and a second NMOS transistor, including: supplying a positive source voltage of a first driver, which is used to drive the first PMOS transistor, from a source terminal of the first PMOS transistor and supplying a first constant voltage as a negative source voltage of the first driver, supplying a positive source voltage of a second driver, which is used to drive the second PMOS transistor, from a source terminal of the second PMOS transistor and supplying a negative source voltage of the second driver from a node located between a first diode and a first capacitor in a circuit where the first diode and the first capacitor are serially connected between a negative source voltage terminal of the first driver and a source terminal of the second PMOS transistor, supplying a second constant voltage as a positive source voltage of a fourth driver for driving the second NMOS transistor, and supplying a ground voltage as a negative source voltage of the fourth driver, and supplying a positive source voltage of a third driver, which is used to drive the first NMOS transistor, from a node located between a second diode and a second capacitor in a circuit where the second diode and the second capacitor are serially connected between a positive source voltage terminal of the fourth driver and a drain terminal of the first NMOS transistor, wherein output terminals of the first to fourth drivers are respectively connected to gate terminals of the first PMOS transistor, the second PMOS transistor, the first NMOS transistor, and the second NMOS transistor, and a signal for controlling switching of the first PMOS transistor, the second PMOS transistor, the first NMOS transistor, and the second NMOS transistor is applied to an input terminal of each of the first to fourth drivers.

BRIEF DESCRIPTION OF THE DRAWINGS

Exemplary embodiments of the inventive concepts will be more clearly understood from the following detailed description taken in conjunction with the accompanying drawings in which:

FIG. 2 is a table showing switching states of a plurality of power switches configuring the DC/DC converter illustrated in FIG. 1 and a voltage state of a node ND3;

DETAILED DESCRIPTION OF EMBODIMENTS

Figure 1:
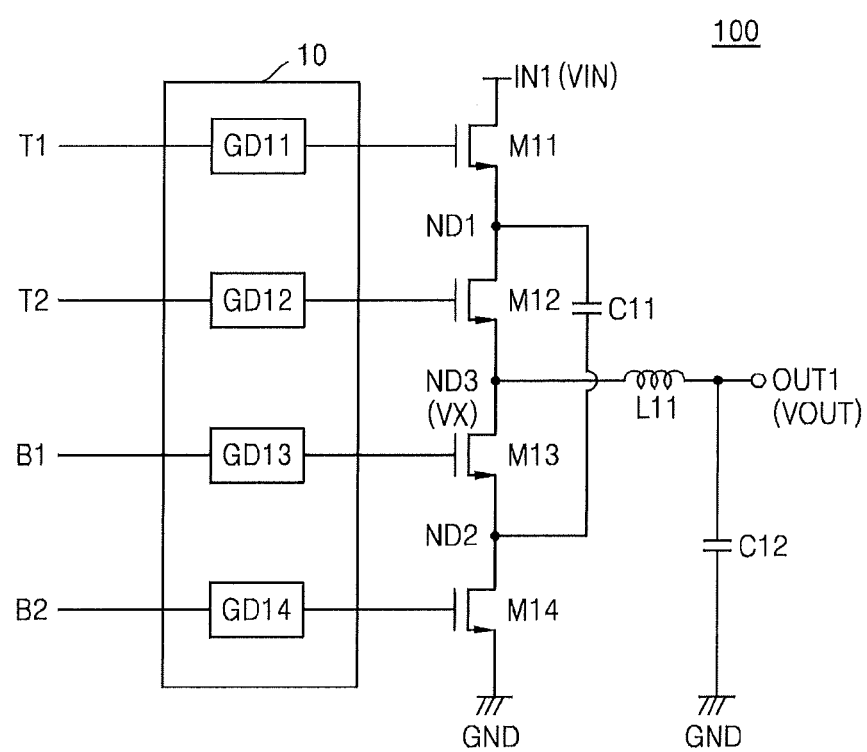
FIG. 1 is a diagram illustrating a configuration of a DC/DC converter according to an exemplary embodiment.

The inventive concepts will now be described more fully hereinafter with reference to the accompanying drawings, in which embodiments of the invention are shown. The embodiments may, however, be embodied in many different forms and should not be construed as limited to the embodiments set forth herein. Rather, these embodiments are provided so that this disclosure will be thorough and complete, and will fully convey the scope of the inventive concepts to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc, may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terms used in this application, only certain embodiments have been used to describe, is not intended to limit the present embodiments. In the following description, the technical terms are used only to explain specific exemplary embodiments while not limiting the exemplary embodiments. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating a configuration of a DC/DC converter 100 according to an exemplary embodiment.

As illustrated in FIG. 1, the DC/DC converter 100 may include four n-type metal-oxide-semiconductor (NMOS) transistors M11 to M14 that operate as switches, two capacitors C11 and C12, an inductor L11, and a driver circuit 10 that drives the four NMOS transistors M11 to M14.

A circuit configuration of the DC/DC converter 100 is described as follows.

The four NMOS transistors M11 to M14 may be connected as a serial string between an input terminal IN1 and a ground terminal GND. The capacitor C11 may be connected between a node ND1 and a node ND2 of the serial string. A source terminal of the NMOS transistor M11 and a drain terminal of the NMOS transistor M12 may be connected to the node ND1, and a source terminal of the NMOS transistor M13 and a drain terminal of the NMOS transistor M14 may be connected to the node ND2. The inductor L11 may be connected between an output terminal OUT1 and a node ND3 corresponding to an intermediate node of the serial string, and the capacitor C12 may be connected between the output terminal OUT1 and the ground terminal GND. An input voltage VIN may be applied to the input terminal IN1.

A gate driver may be connected to a gate terminal of each of the four NMOS transistors M11 to M14. That is, a gate driver GD11 may be connected to the gate terminal of the NMOS transistor M11, a gate driver GD12 may be connected to the gate terminal of the NMOS transistor M12, a gate driver GD13 may be connected to the gate terminal of the NMOS transistor M13, and a gate driver GD14 may be connected to the gate terminal of the NMOS transistor M14.

Logic states of control signals T1, T2, B1 and B2 respectively applied to the gate drivers GD11 to GD14 may be determined in order for states S1 to S4 of FIG. 2 to be sequentially provided.

FIG. 2 is a table showing switching states of a plurality of power switches configuring the DC/DC converter 100 illustrated in FIG. 1 and a voltage state of the node ND3.

Referring to FIG. 2, in the state S1, the NMOS transistors M11 and M12 may be turned on, and the NMOS transistors M13 and M14 may be turned off. Therefore, a voltage Vx of the node ND3 may be VIN.

In the state S2, the NMOS transistors M12 and M14 may be turned on, and the NMOS transistors M11 and M13 may be turned off. In the state S2, the voltage Vx of the node ND3 may be VIN/2, based on a voltage "VIN/2" charged into the capacitor C11 that operates as a flying capacitor.

In the state S3, the NMOS transistors M11 and M13 may be turned on, and the NMOS transistors M12 and M14 may be turned off. In the state S3, the voltage Vx of the node ND3 may be VIN/2, based on a voltage "VIN/2" charged into the capacitor C11 that operates as the flying capacitor.

In the state S4, the NMOS transistors M13 and M14 may be turned on, and the NMOS transistors M11 and M12 may be turned off. Therefore, a voltage Vx of the node ND3 may be 0 V.

A voltage VOUT of the output terminal OUT1 may be controlled by switching operations of the four NMOS transistors M11 to M14.

In the driver circuit 10, the gate driver GD11 may output a higher voltage than the input voltage VIN in the states S1 and S3 where the NMOS transistor M11 is turned on. Therefore, a higher voltage than the input voltage VIN may be supplied to the driver circuit 10. Therefore, circuit elements of the driver circuit 10 may be implemented to have a standard of a withstand voltage that is higher than the input voltage VIN.

Figure 3:
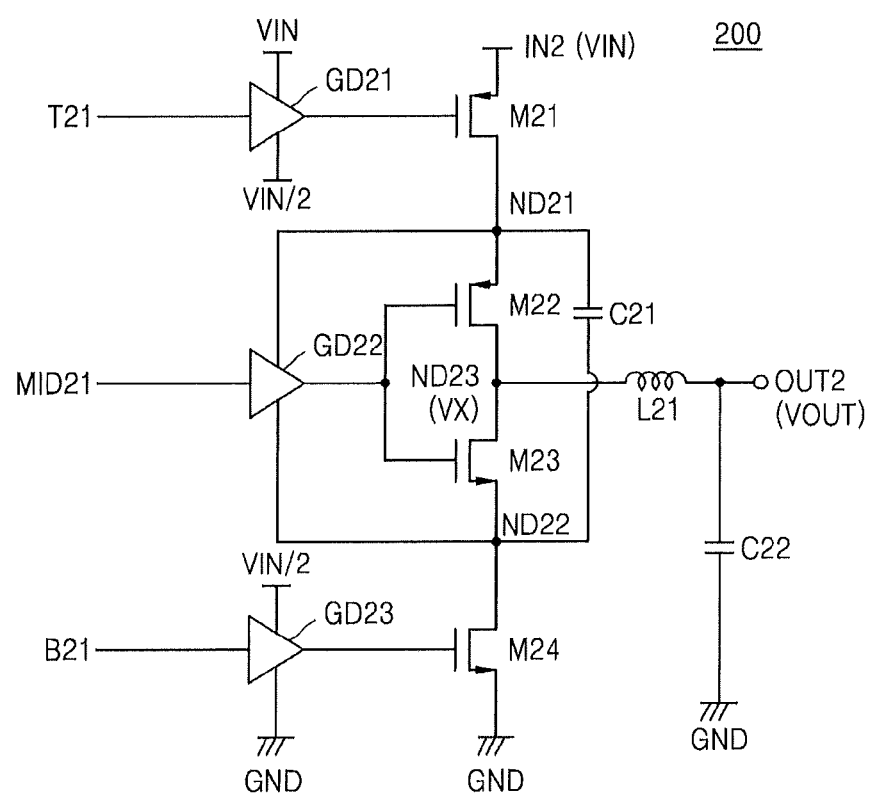
FIG. 3 is a diagram illustrating a configuration of a DC/DC converter according to another exemplary embodiment.

FIG. 3 is a diagram illustrating a configuration of a DC/DC converter 200 according to another exemplary embodiment.

As illustrated in FIG. 3, the DC/DC converter 200 may include four transistors M21 to M24, two capacitors C21 and C22, an inductor L21, and a plurality of gate drivers GD21 to GD23.

Two p-type metal-oxide-semiconductor (PMOS) transistors M21 and M22 and two NMOS transistors M23 and M24 may be connected as a serial string between an input terminal IN2 and a ground terminal GND. The capacitor C21 may be connected between a node ND21 and a node ND22 of the serial string. A drain terminal of the PMOS transistor M21 and a source terminal of the PMOS transistor M22 may be connected to the node ND21, and a source terminal of the NMOS transistor M23 and a drain terminal of the NMOS transistor M24 may be connected to the node ND22. The inductor L21 may be connected between an output terminal OUT2 and a node ND23 corresponding to an intermediate node of the serial string, and the capacitor C22 may be connected between the output terminal OUT2 and the ground terminal GND. An input voltage VIN may be applied to the input terminal IN2.

The gate driver GD21 is a driver for driving the PMOS transistor M21 and may be connected to a gate terminal of the PMOS transistors M21. The gate driver GD22 is a driver for driving the PMOS transistor M22 and the NMOS transistor M23 and may be connected to a gate terminal of the PMOS transistors M22 and a gate terminal of the NMOS transistor M23. The gate driver GD23 is a driver for driving the NMOS transistor M24 and may be connected to a gate terminal of the NMOS transistors M24.

Figure 4:
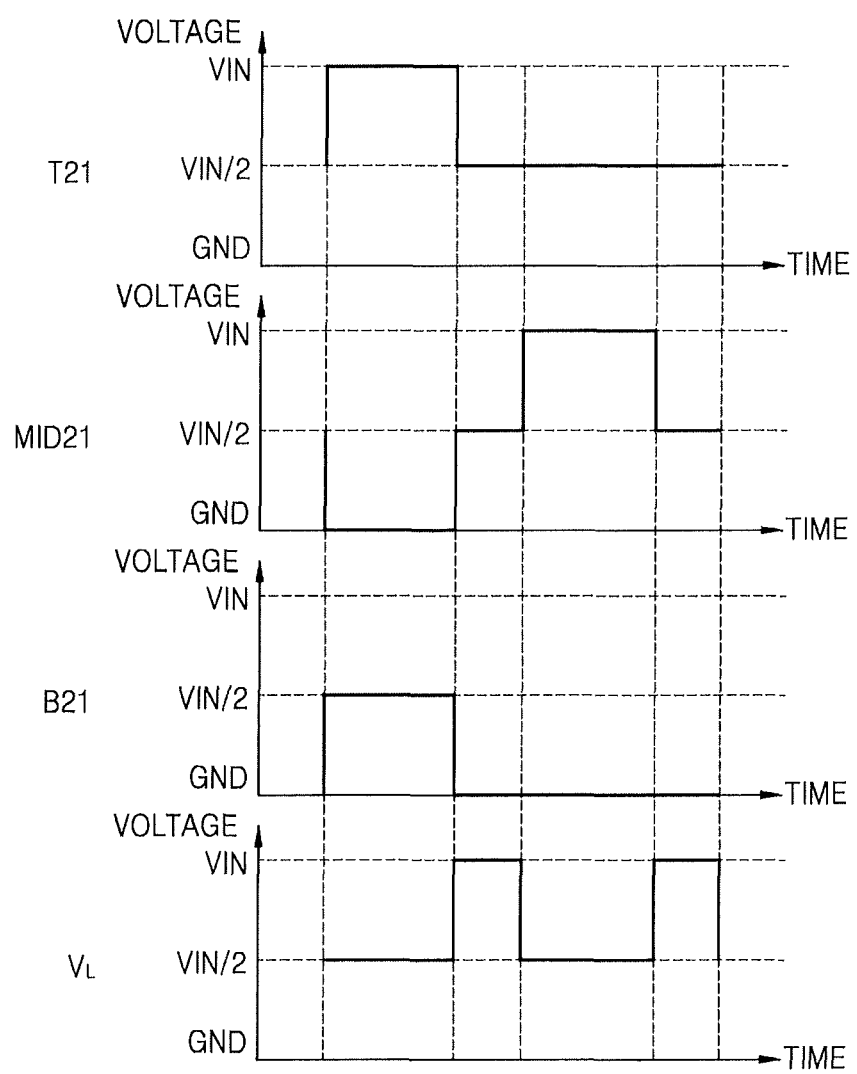
FIG. 4 is a diagram showing waveforms of main signals of the DC/DC converter illustrated in FIG. 3.

Waveforms of control signals T21, MID21 and B21 respectively applied to the gate drivers GD21 to GD23 and a voltage $V_L$ of the node ND23 are shown in FIG. 4.

The gate driver GD21 may operate at voltages of a range from VIN/2 to VIN, and the gate driver GD23 may operate at voltages of a range from 0 to VIN/2. Also, the gate driver GD22 may operate with a voltage charged into the capacitor C21 that operates as a flying capacitor. That is, the gate driver GD22 may operate at 0 to VIN/2 or VIN/2 to VIN.

Therefore, the voltage charged into the capacitor C21 may be always maintained as VIN/2 in order for the gate driver GD22 to stably operate. Also, a voltage regulator for generating VIN/2 may be used.

When an input voltage VIN that is two or more times higher than a gate-source rated voltage of each of the PMOS transistors M21 and M22 which are power switches is applied, the PMOS transistors M21 and M22 are damaged. For example, when a gate-source voltage "VIN−VIN/2" in a section where the PMOS transistor M21 is turned on is applied as two or more times higher than a rated voltage, the PMOS transistor M21 is damaged.

As described above, in another exemplary embodiment, a new DC/DC converter 300 for overcoming limitations of the DC/DC converter 100 of FIG. 1 and the DC/DC converter 200 of FIG. 3 is proposed.

Hereinafter, the new DC/DC converter 300 proposed according to another exemplary embodiment will be described in detail.

Figure 5:
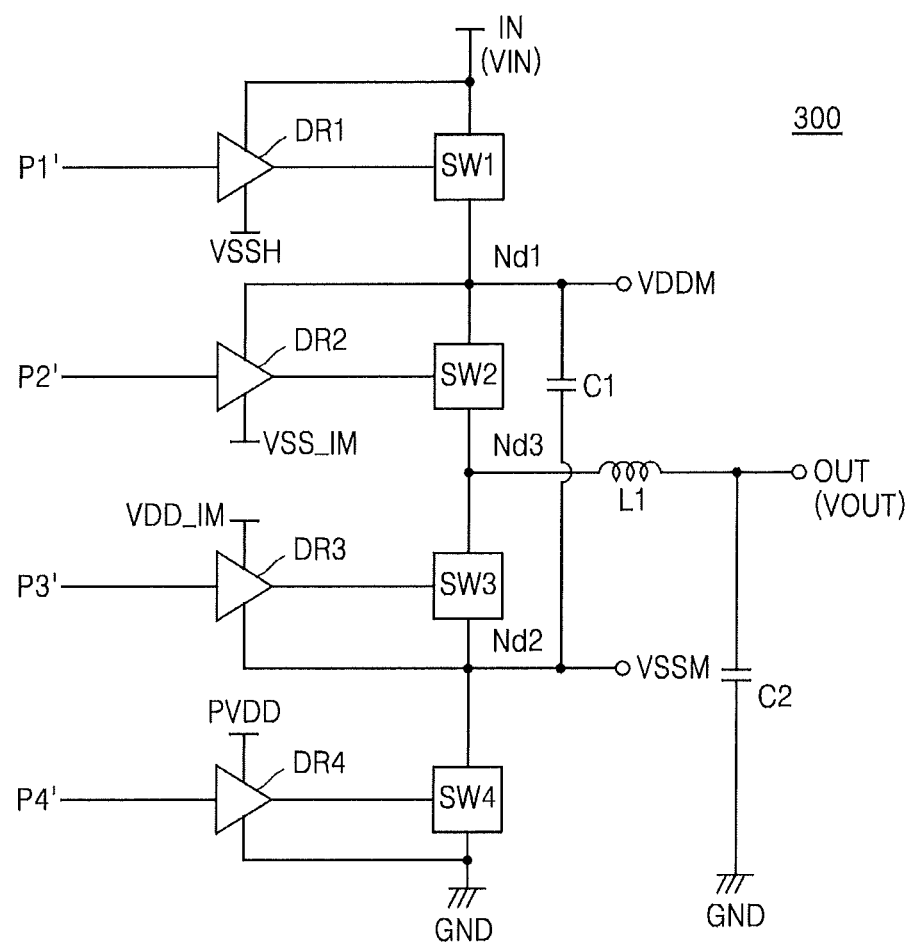
FIG. 5 is a diagram illustrating a configuration of a DC/DC converter according to another exemplary embodiment.

FIG. 5 is a diagram illustrating a configuration of the DC/DC converter 300 according to another exemplary embodiment.

As illustrated in FIG. 5, the DC/DC converter 300 may include a plurality of power switches SW1 to SW4, a plurality of drivers DR1 to DR4, a plurality of capacitors C1 and C2, and an inductor L1.

The plurality of power switches SW1 to SW4 may be connected as a serial string between an input terminal IN and a ground terminal GND. The capacitor C1 may be connected between a node Nd1 and a node Nd2 of the serial string. In the serial string, the node Nd1 may be disposed between the power switch SW1 and the power switch SW2, and the node Nd2 may be disposed between the power switch SW3 and the power switch SW4. The inductor L1 may be connected between an output terminal OUT and a node Nd3 corresponding to an intermediate node of the serial string, and the capacitor C2 may be connected between the output terminal OUT and the ground terminal GND. The input voltage VIN may be applied to the input terminal TN. In the serial string, the node Nd3 may be disposed between the power switch SW2 and the power switch SW3.

The plurality of drivers DR1 to DR4 may be respectively connected to the plurality of power switches SW1 to SW4. In detail, an output signal of the driver DR1 may be applied to the power switch SW1, an output signal of the driver DR2 may be applied to the power switch SW2, an output signal of the driver DR3 may be applied to the power switch SW3, and an output signal of the driver DR4 may be applied to the power switch SW4. The plurality of power switches SW1 to SW4 may be turned on or off based on voltage levels of respective signals applied from the plurality of drivers DR1 to DR4.

The drivers DR1 and DR2 may correspond to high-side drivers that respectively generate switching control signals for high-side power switches SW1 and SW2 connected between the input terminal IN and the node Nd3 of the serial string. Also, the drivers DR3 and DR4 may correspond to low-side drivers that respectively generate switching control signals for low-side power switches SW3 and SW4 connected between the node Nd3 of the serial string and the ground terminal GND.

A negative source voltage supplied to at least one of the high-side drivers DR1 and DR2 and a positive source voltage supplied to at least one of the low-side drivers DR3 and DR4 may be set as different constant voltages.

For example, a negative source voltage of the high-side driver DR1 may be set as a constant voltage VSSH, and a positive source voltage supplied to the low-side driver DR4 may be set as a constant voltage PVDD. The constant voltages VSSH and PVDD may correspond to different constant voltages. The constant voltage VSSH may be determined as having a voltage level that satisfies a condition for turning on the power switch SW3, and the constant voltage PVDD may be determined as having a voltage level that satisfies a condition for turning on the power switch SW4.

For example, the constant voltages VSSH and PVDD may be generated by different voltage regulators. Also, a positive source voltage of the high-side driver DR1 may be set as the input voltage VIN, and a negative source voltage supplied to the low-side driver DR4 may be set as a ground voltage.

A positive source voltage terminal of the high-side driver DR2 may be connected to the node Nd1, and a negative source voltage VSS_IM may be generated from the constant voltage VSSH and a voltage VDDM of the node Nd1. A negative source voltage terminal of the low-side driver DR3 may be connected to the node Nd2, and a positive source voltage VDD_IM may be generated from the constant voltage PVDD and a voltage VSSM of the node Nd2. A detailed circuit for generating the negative source voltage VSS_IM of the high-side driver DR2 and the positive source voltage VDD_IM of the low-side driver DR3 will be described below in detail.

A plurality of control signals P1' to P4' necessary to switching-control the plurality of power switches SW1 to SW4 may be respectively applied to the plurality of drivers DR1 to DR4.

Figure 6:
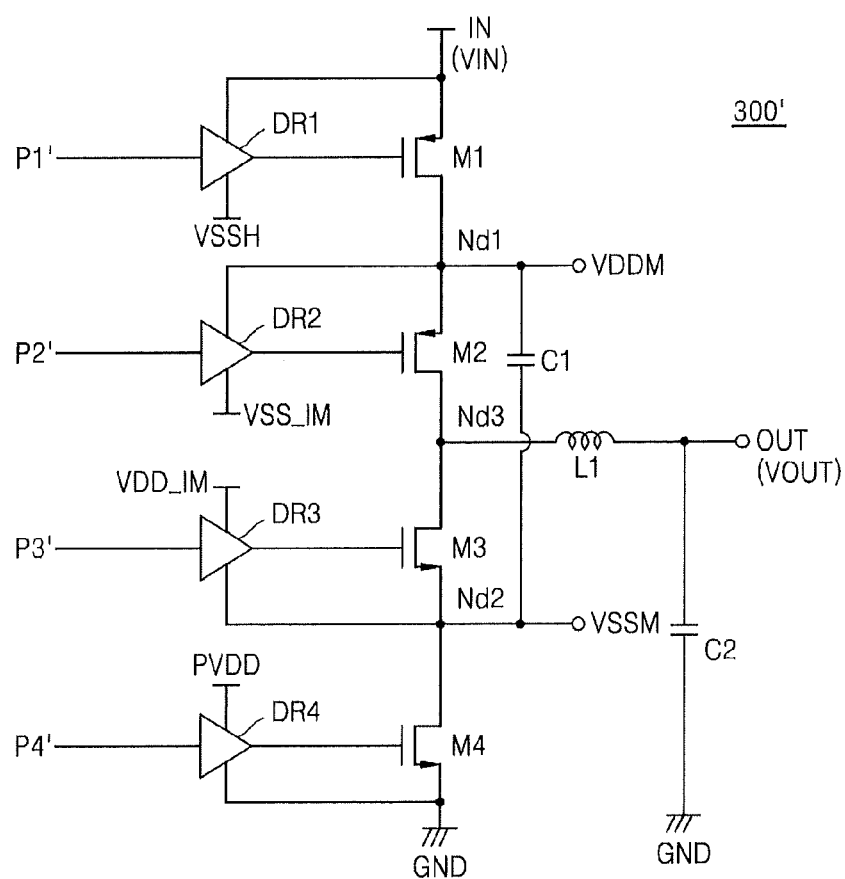
FIG. 6 exemplarily illustrates a diagram of a configuration in which power switches of FIG. 5 are implemented using transistors.

FIG. 6 exemplarily illustrates a diagram of a configuration in which the power switches SW1 to SW4 of FIG. 5 are implemented using transistors.

Referring to FIG. 6, a DC/DC converter 300' may include a plurality of transistors M1 to M4 that are connected as a serial string between an input terminal IN and a ground terminal GND. For example, high-side transistors M1 and M2 may be implemented as PMOS transistors between the input terminal IN and an intermediate node Nd3 of the serial string, and low-side transistors M3 and M4 which are connected between the intermediate node Nd3 of the serial string and the ground terminal GND may be implemented as NMOS transistors.

The drivers DR1 and DR2 may respectively generate gate control signals for the high-side PMOS transistors M1 and M2. The drivers DR3 and DR4 may respectively generate gate control signals for the low-side NMOS transistors M3 and M4.

Figure 7:
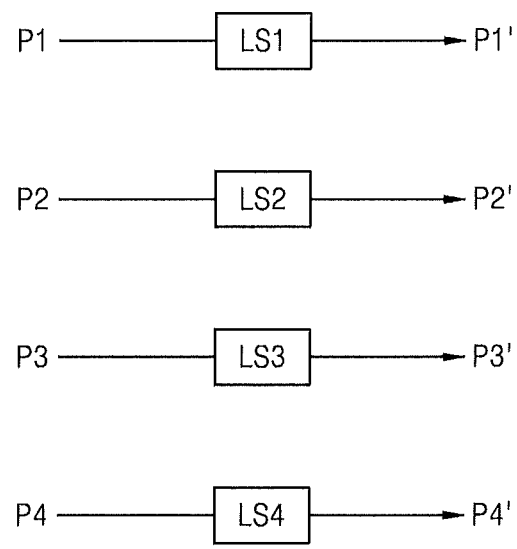
FIG. 7 is a diagram illustrating a connection relationship between a plurality of level shifters added into the DC/DC converter of FIG. 5.

FIG. 7 is a diagram illustrating an interconnection between a plurality of level shifters, control signals and voltage shifted control signals added into the DC/DC converter of FIG. 5.

Referring to FIG. 7, the DC/DC converter 300 of FIG. 5 may further include a plurality of level shifters LS1 to LS4. The level shifters LS1 to LS4 may respectively adjust voltage levels of control signals P1 to P4 output from a controller (see descriptions of FIGS. 12 to 16). For example, operating voltage ranges of the level shifters LS1 to LS4 may respectively match those of drivers DR1 to DR4 corresponding thereto. For example, a positive source voltage and a negative source voltage of the level shifter LS1 may match those of the driver DR1. In this way, positive source voltages and negative source voltages of the level shifters LS2 to LS4 may respectively match those of the drivers DR2 to DR4. The level shifters generate voltage shifted control signals P1' to P4' by shifting voltage levels of the control signal P1 to P4.

Figure 8:
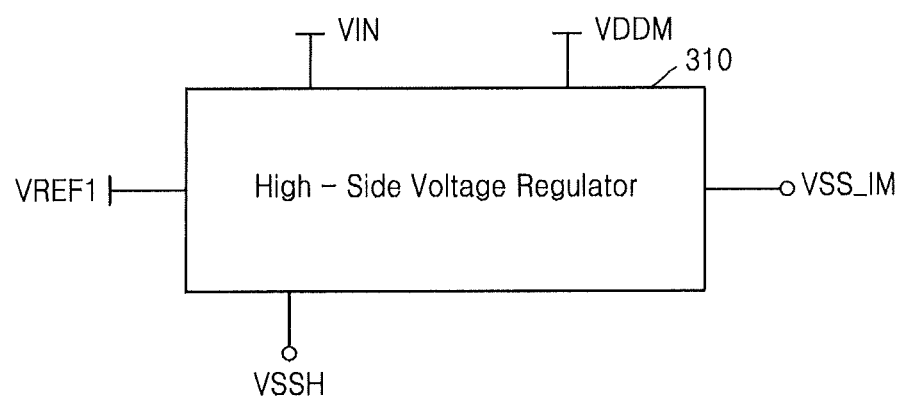
FIG. 8 is a diagram illustrating input/output terminals of a high-side voltage regulator circuit which generates source voltages of high-side drivers illustrated in FIG. 6.

FIG. 8 is a diagram illustrating input/output terminals of a high-side voltage regulator circuit 310 which generates source voltages of the high-side drivers DR1 and DR2 illustrated in FIG. 6.

The high-side voltage regulator circuit 310 may generate the constant voltage VSSH, based on the input voltage VIN and a first reference voltage VREF1. Also, the high-side voltage regulator circuit 310 may generate the negative source voltage VSS_IM, based on the constant voltage VSSH and the voltage VDDM of the node Nd1. For example, the negative source voltage VSS_IM may be generated from the constant voltage VSSH and the voltage VDDM of the node Nd1 by using a diode and a capacitor circuit. For example, referring again to FIG. 6, the high-side voltage regulator circuit 310 may be implemented so that the negative source voltage VSS_IM is discharged to a voltage "VSSH+VD" when the transistor M1 is turned on. Here, VD is a diode forward voltage.

Figure 9:
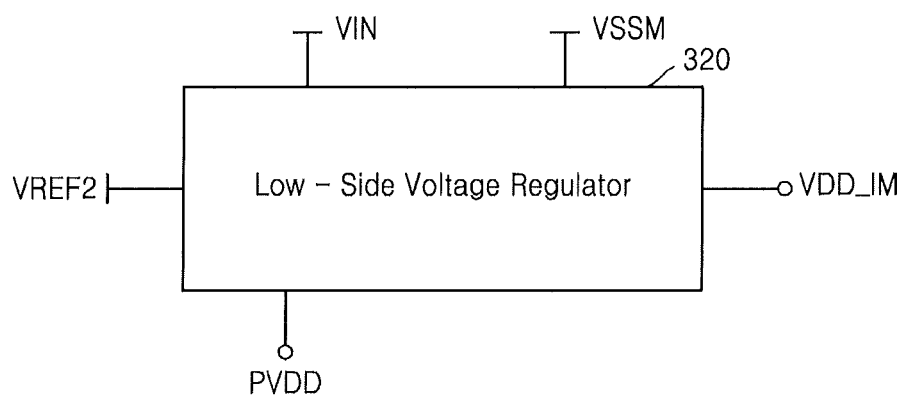
FIG. 9 is a diagram illustrating input/output terminals of a low-side voltage regulator circuit which generates source voltages of low-side drivers illustrated in FIG. 6.

FIG. 9 is a diagram illustrating input/output terminals of a low-side voltage regulator circuit 320 which generates source voltages of low-side drivers DR3 and DR4 illustrated in FIG. 6.

The low-side voltage regulator circuit 320 may generate the constant voltage PVDD, based on the input voltage VIN and a second reference voltage VREF2. Also, the low-side voltage regulator circuit 320 may generate the positive source voltage VDD_IM, based on the constant voltage PVDD and the voltage VSSM of the node Nd2. For example, the positive source voltage VDD_IM may be generated from the constant voltage PVDD and the voltage VSSM of the node Nd2 by using a diode and a capacitor circuit. For example, referring again to FIG. 6, the low-side voltage regulator circuit 320 may be implemented so that the positive source voltage VDD_IM is discharged to a voltage "PVDD−VD" when the transistor M4 is turned on. Here, VD is a diode forward voltage.

Figure 10:
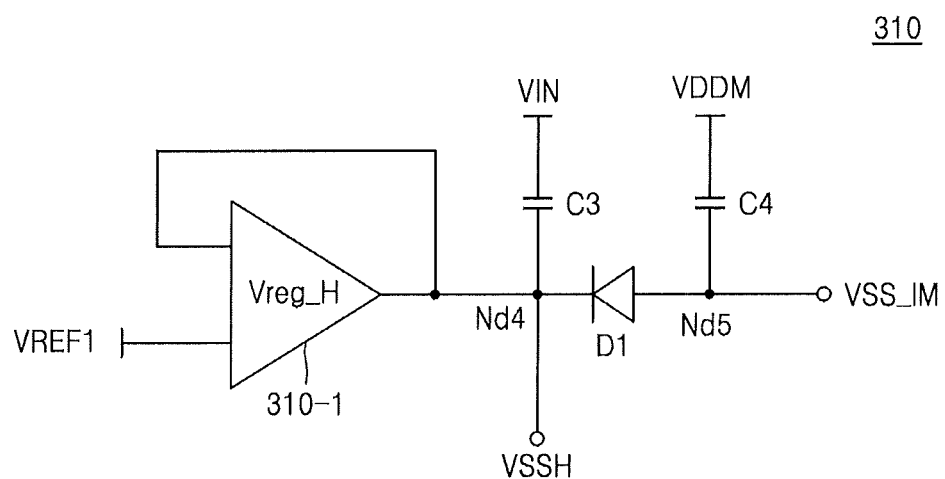
FIG. 10 is a diagram illustrating a detailed configuration of the high-side voltage regulator circuit illustrated in FIG. 8.

FIG. 10 is a diagram illustrating a detailed configuration of the high-side voltage regulator circuit 310 illustrated in FIG. 8.

Referring to FIG. 10, the high-side voltage regulator circuit 310 may include a first voltage regulator "Vreg_H" 310-1, a plurality of capacitors C3 and C4, and a diode D1.

The first voltage regulator 310-1 may generate the constant voltage VSSH from the input voltage VIN, based on the first reference voltage VREF1. Various types of constant voltage generation circuits may be applied to the first voltage regulator 310-1. For example, a low-dropout (LDO) regulator may be applied. The constant voltage VSSH may be determined as having a voltage value that is lower by a certain margin voltage than a voltage value obtained by subtracting a source-gate voltage, which is necessary to turn on the PMOS transistor M1, from the input voltage VIN.

The capacitor C3 may be connected between an input voltage VIN terminal and a node Nd4 from which the constant voltage VSSH is output. A diode D1 may be connected between the node Nd4 and a node Nd5 from which the negative source voltage VSS_IM of the driver DR2 is output. An anode of the diode D1 may be connected to the node Nd5, and a cathode of the diode D1 may be connected to the node Nd4. Also, the capacitor C4 may be connected between the node Nd5 and the node Nd1 of FIG. 6 from which the voltage VDDM is generated.

Referring to FIGS. 6 and 10, when the transistor M1 is turned on by using the negative source voltage VSS_IM of the driver DR2, the voltage VDDM of the node Nd1 may become equal to the input voltage VIN. Also, when the voltage VSS_IM is higher than the constant voltage VSSH, the diode D1 may be turned on. Therefore, the voltage VSS_IM may be discharged to "VSSH+VD". Here, VD is a diode forward voltage. The voltage VSS_IM may be used as the negative source voltage of the driver DR2.

Figure 11:
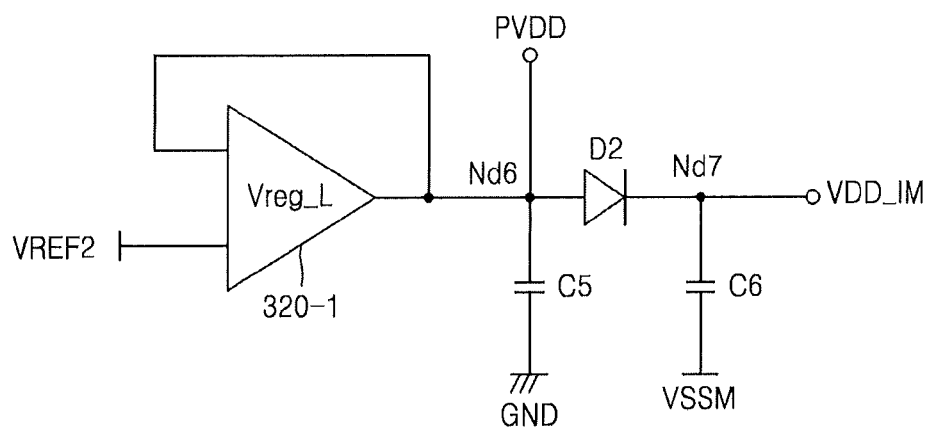
FIG. 11 is a diagram illustrating a detailed configuration of the low-side voltage regulator circuit illustrated in FIG. 9.

FIG. 11 is a diagram illustrating a detailed configuration of the low-side voltage regulator circuit 320 illustrated in FIG. 9.

Referring to FIG. 11, the low-side voltage regulator circuit 320 may include a second voltage regulator "Vreg_L" 320-1, a plurality of capacitors C5 and C6, and a diode D2.

The second voltage regulator 320-1 may generate the constant voltage PVDD from the input voltage VIN, based on the second reference voltage VREF2. Various types of constant voltage generation circuits may be applied to the second voltage regulator 320-1. For example, an LDO regulator may be applied. The constant voltage PVDD may be determined as having a voltage value that is higher by a certain margin voltage than a voltage value obtained by adding a source-gate voltage, which is necessary to turn on the NMOS transistor M4, from the ground voltage.

The capacitor C5 may be connected between a ground terminal GND and a node Nd6 from which the constant voltage PVDD is output. A diode D2 may be connected between the node Nd6 and a node Nd7 from which the positive source voltage VDD_IM of the driver DR3 is output. An anode of the diode D2 may be connected to the node Nd6, and a cathode of the diode D2 may be connected to the node Nd7. Also, the capacitor C6 may be connected between the node Nd7 and the node Nd2 of FIG. 6 from which the voltage VSSM is generated.

Referring to FIGS. 6 and 11, when the transistor M4 is turned on by using the positive source voltage VDD_IM of the driver DR3, the voltage VSSM of the node Nd2 may become equal to the ground voltage. Also, when the voltage VDD_IM is lower than the constant voltage PVDD, the diode D2 may be turned on. Therefore, the voltage VDD_IM may be discharged to "PVDD−VD". Here, VD is a diode forward voltage. The voltage VDD_IM may be used as the positive source voltage of the driver DR3.

Figure 12:
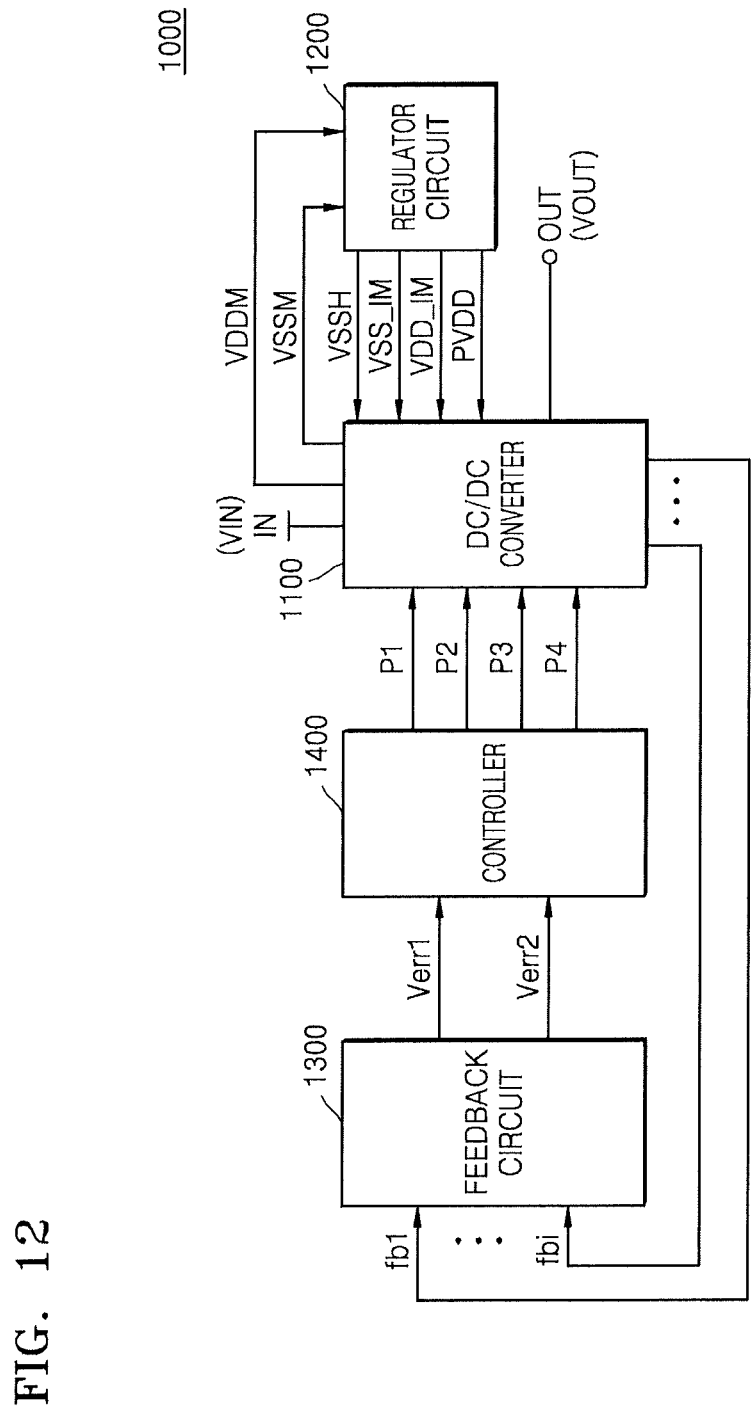
FIG. 12 is a block diagram illustrating a configuration of a power supply according to an exemplary embodiment.

FIG. 12 is a block diagram illustrating a configuration of a power supply 1000 according to an exemplary embodiment.

Referring to FIG. 12, the power supply 1000 may include a DC/DC converter 1100, a regulator circuit 1200, a feedback circuit 1300, and a controller 1400.

The DC/DC converter 1100 may generate an output voltage VOUT, which is lower by a certain voltage than an input voltage VIN, from a plurality of control signals P1 to P4 supplied from the controller 1400. The DC/DC converter 1100 may change a path of a current, flowing to at least one inductor and capacitor which are included in a circuit between an input terminal IN and an output terminal OUT, to generate an output voltage and at least two feedback signals fb1 to fbi (where I is an integer equal to or more than two), based on the control signals P1 to P4.

For example, the DC/DC converter 1100 may use the DC/DC converter 300 of FIG. 5 or the DC/DC converter 300' of FIG. 6.

Some source voltages necessary for a plurality of drivers included in the DC/DC converter 1100 may be supplied from the regulator circuit 1200. For example, the regulator circuit 1200 may include the high-side voltage regulator circuit 310 of FIG. 10 and the low-side voltage regulator circuit 320 of FIG. 11.

The feedback circuit 1300 may receive at least two feedback signals fb1 to fbi from the DC/DC converter 1100 and generate a first error signal Verr1 and a second error signal Verr2, based on a difference between the at least two feedback signals fb1 to fbi and a reference source. The first error signal Verr1 and the second error signal Verr2 generated by the feedback circuit 1300 may be output to the controller 1400.

The controller 1400 may generate the control signals P1 to P4 for allowing one of an output voltage, an output current, and an input current to converge on a target value, based on the first error signal Verr1 and the second error signal Verr2. The control signals P1 to P4 may be output to the DC/DC converter 1100.

Figure 13:
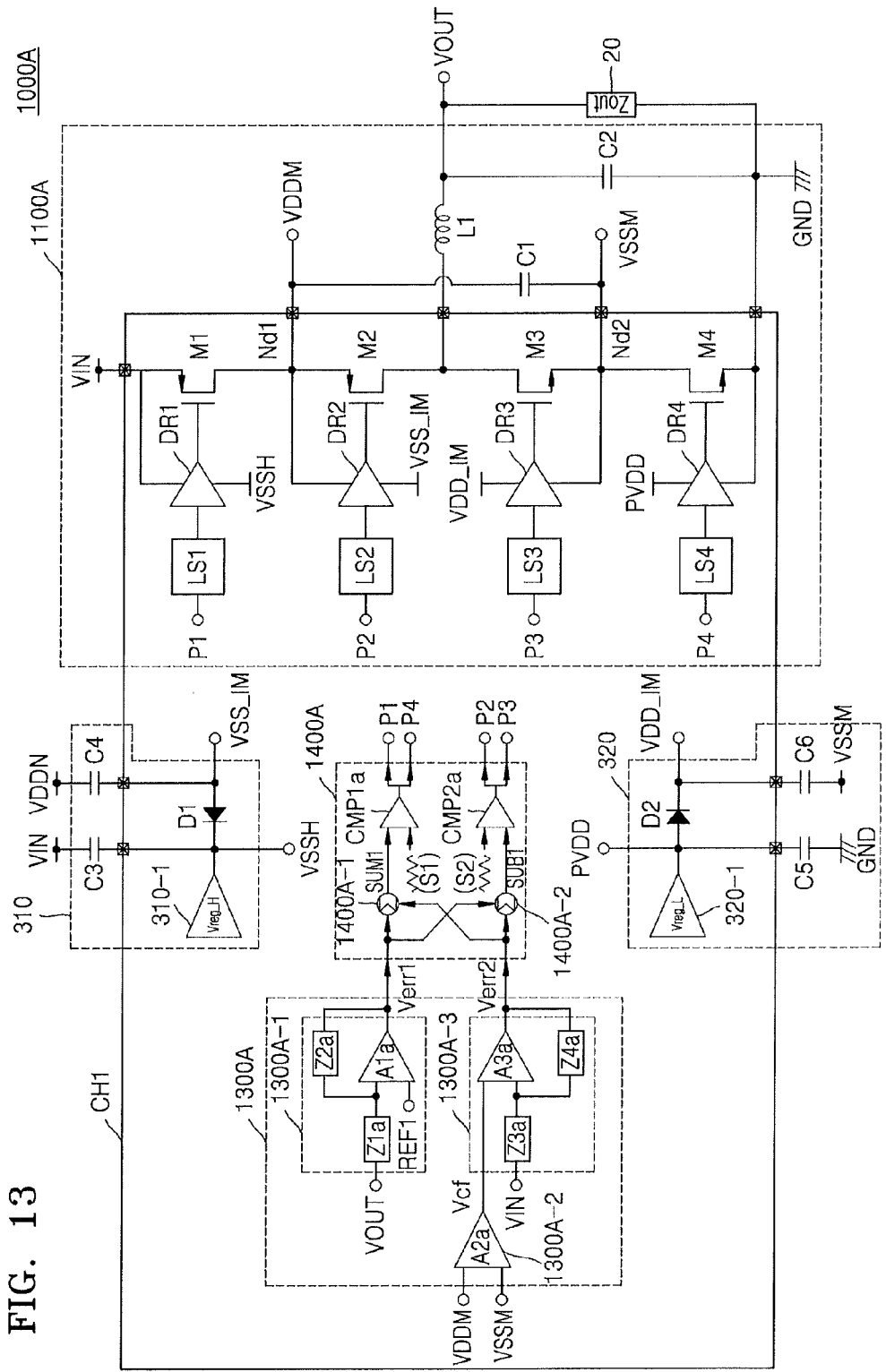
FIG. 13 is a diagram illustrating an example of a detailed circuit configuration of the power supply illustrated in FIG. 12.

FIG. 13 is a diagram illustrating an example 1000A of a detailed circuit configuration of the power supply 1000 illustrated in FIG. 12.

Referring to FIG. 13, a power supply 1000A may include a DC/DC converter 1100A, a feedback circuit 1300A, a controller 1400A, a high-side voltage regulator circuit 310, and a low-side voltage regulator circuit 320. For reference, a load circuit 20 which is connected between an output terminal and a ground terminal GND of the DC/DC converter 1100A is illustrated. FIG. 13 illustrates a circuit that controls an output voltage VOUT to maintain a target voltage level.

The DC/DC converter 1100A may include a circuit configuration where the level shifters LS1 to LS4 of FIG. 7 are added into the DC/DC converter 300' illustrated in FIG. 6. In the DC/DC converter 1100A, a negative source voltage VSSH of a driver DR1 and a negative source voltage VSS_IM of a driver DR2 may be applied from the high-side voltage regulator circuit 310. Also, a positive source voltage PVDD of a driver DR4 and a positive source voltage VDD_IM of a driver DR3 may be applied from the low-side voltage regulator circuit 320.

The feedback circuit 1300A may include first to third amplifier circuits 1300A-1 to 1300A-3. The output voltage VOUT, a voltage VDDM, and a voltage VSSM may be input from the DC/DC converter 1100A to the feedback circuit 1300A. The voltage VDDM may be a voltage that is detected from a node Nd1 of the DC/DC converter 1100A, and the voltage VSSM may be a voltage that is detected from a node Nd2 of the DC/DC converter 1100A.

The first amplifier circuit 1300A-1 may be configured with an operational (OP) amplifier A1a and two impedances Z1a and Z2a. The first amplifier circuit 1300A-1 may amplify a difference between the output voltage VOUT of the DC/DC converter 1100A and a reference source REF1 to output a first error signal Verr1, based on a gain value of the first amplifier circuit 1300A-1. A gain value of the first amplifier circuit 1300A-1 may be adjusted based on a ratio of the two impedances Z1a and Z2a.

The second amplifier circuit 1300A-2 may be configured with an OP amplifier A2a. The second amplifier circuit 1300A-2 may amplify a difference between the voltage VDDM and the voltage VSSM input from the DC/DC converter 1100A to output a voltage Vcf. For example, a gain value of the second amplifier circuit 1300A-2 may be set to 1.

The third amplifier circuit 1300A-3 may be configured with an OP amplifier A3a and two impedances Z3a and Z4a. The third amplifier circuit 1300A-3 may amplify a difference between an input voltage VIN of the DC/DC converter 1100A and the voltage Vcf output from the second amplifier circuit 1300A-2 to output a second error signal Verr2, based on a gain value of the third amplifier circuit 1300A-3. A gain value of the third amplifier circuit 1300A-3 may be adjusted based on a ratio of the two impedances Z3a and Z4a.

The first error signal Verr1 and the second error signal Verr2 generated by the feedback circuit 1300A may be output to the controller 1400A.

The controller 1400A may include an adder 1400A-1, a subtractor 1400A-2, and first and second comparators CMP1a and CMP2a.

The controller 1400A may compare an operational combination of the first and second error signals Verr1 and Verr2 with a triangular wave having a 180-degree phase difference with the operational combination to generate a plurality of control signals P1 to P4 as follows.

The adder 1400A-1 may summate a voltage of the first error signal Verr1 and a voltage of the second error signal Verr2 to generate a first signal SUM1. The subtractor 1400A-2 may generate a second signal SUB1 corresponding to a difference between the first error signal Verr1 and the second error signal Verr2. In detail, the subtractor 1400A-2 may subtract the voltage of the second error signal Verr2 from the voltage of the first error signal Verr1 to generate the second signal SUB1.

The first comparator CMP1a may compare a voltage level of the first signal SUM1 with a voltage level of a first triangular wave signal S1 and generate the control signals P1 and P4, based on a result of the comparison. Therefore, the control signals P1 and P4 may be square waves having the same phase.

The second comparator CMP2a may compare a voltage level of the second signal SUB1 with a voltage level of a second triangular wave signal S2 and generate the control signals P2 and P3, based on a result of the comparison. Here, the second triangular wave signal S2 may be implemented to have a 180-degree phase difference with the first triangular wave signal S1. Therefore, the control signals P2 and P3 may be square waves having the same phase.

Switching duties of a plurality of transistors M1 to M4 included in the DC/DC converter 1100A may be adjusted by the generated control signals P1 to P4, and thus, the voltage Vcf corresponding to the difference between the voltage VDDM and the voltage VSSM may be controlled to VIN/2, thereby obtaining a desired output voltage VOUT.

For example, circuits implemented as one semiconductor chip among the circuit elements configuring the power supply 1000A of FIG. 13 are referred to by CH1.

Figure 14:
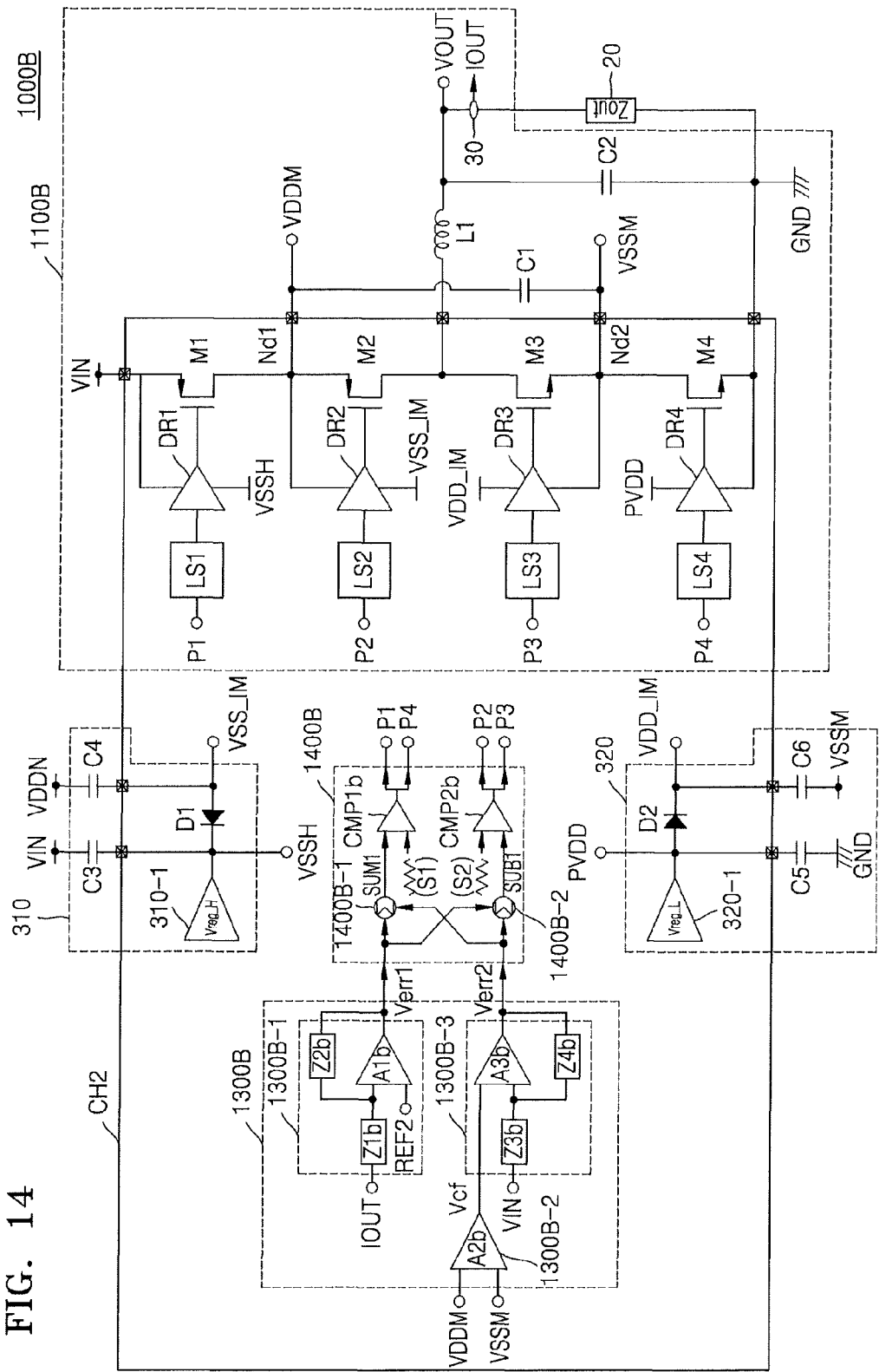
FIG. 14 is a diagram illustrating another example of a detailed circuit configuration of the power supply illustrated in FIG. 12.

FIG. 14 is a diagram illustrating another example 1000B of a detailed circuit configuration of the power supply 1000 illustrated in FIG. 12.

Referring to FIG. 14, a power supply 1000B may include a DC/DC converter 1100B, a feedback circuit 1300B, a controller 1400B, a high-side voltage regulator circuit 310, and a low-side voltage regulator circuit 320. For reference, a load circuit 20 which is connected between an output terminal and a ground terminal GND of the DC/DC converter 1100B is illustrated. FIG. 14 illustrates a circuit that controls an output current IOUT to maintain a target current level.

The DC/DC converter 1100B may include a circuit configuration where the level shifters LS1 to LS4 of FIG. 7 are added into the DC/DC converter 300' illustrated in FIG. 6. In the DC/DC converter 1100B, a negative source voltage VSSH of a driver DR1 and a negative source voltage VSS_IM of a driver DR2 may be applied from the high-side voltage regulator circuit 310. Also, a positive source voltage PVDD of a driver DR4 and a positive source voltage VDD_IM of a driver DR3 may be applied from the low-side voltage regulator circuit 320.

The DC/DC converter 1100B may include a current sensor 30 that senses the output current IOUT flowing from an output terminal OUT to the load circuit 20.

The feedback circuit 1300B may include first to third amplifier circuits 1300B-1 to 1300B-3. The output current IOUT, a voltage VDDM, and a voltage VSSM may be input from the DC/DC converter 1100B to the feedback circuit 1300B. The voltage VDDM may be a voltage that is detected from a node Nd1 of the DC/DC converter 1100B, and the voltage VSSM may be a voltage that is detected from a node Nd2 of the DC/DC converter 1100B.

The first amplifier circuit 1300B-1 may be configured with an OP amplifier A1b and two impedances Z1b and Z2b. The first amplifier circuit 1300B-1 may amplify a difference between the output current IOUT and a reference source REF2 to output a first error signal Verr1, based on a gain value of the first amplifier circuit 1300B-1. A gain value of the first amplifier circuit 1300B-1 may be adjusted based on a ratio of the two impedances Z1b and Z2b.

The second amplifier circuit 1300B-2 may be configured with an OP amplifier A2b. The second amplifier circuit 1300B-2 may amplify the difference between the voltage VDDM and the voltage VSSM input from the DC/DC converter 1100B to output a voltage Vcf. For example, a gain value of the second amplifier circuit 1300B-2 may be set to 1.

The third amplifier circuit 1300B-3 may be configured with an OP amplifier A3b and two impedances Z3b and Z4b. The third amplifier circuit 1300B-3 may amplify a difference between an input voltage VIN of the DC/DC converter 1100B and the voltage Vcf output from the second amplifier circuit 1300B-2 to output a second error signal Verr2, based on a gain value of the third amplifier circuit 1300B-3. A gain value of the third amplifier circuit 1300B-3 may be adjusted based on a ratio of the two impedances Z3b and Z4b.

The first error signal Verr1 and the second error signal Verr2 generated by the feedback circuit 1300B may be output to the controller 1400B.

The controller 1400B may include an adder 1400B-1, a subtractor 1400B-2, and first and second comparators CMP1b and CMP2b.

The controller 1400B may compare an operational combination of the first and second error signals Verr1 and Verr2 with a triangular wave having a 180-degree phase difference with the operational combination to generate a plurality of control signals P1 to P4 as follows.

The adder 1400B-1 may summate a voltage of the first error signal Verr1 and a voltage of the second error signal Verr2 to generate a first signal SUM1. The subtractor 1400B-2 may generate a second signal SUB1 corresponding to a difference between the first error signal Verr1 and the second error signal Verr2. In detail, the subtractor 1400B-2 may subtract the voltage of the second error signal Verr2 from the voltage of the first error signal Verr1 to generate the second signal SUB1.

The first comparator CMP1b may compare a voltage level of the first signal SUM1 with a voltage level of a first triangular wave signal S1 and generate the control signals P1 and P4, based on a result of the comparison. Therefore, the control signals P1 and P4 may be square waves having the same phase.

The second comparator CMP2b may compare a voltage level of the second signal SUB1 with a voltage level of a second triangular wave signal S2 and generate the control signals P2 and P3, based on a result of the comparison. Here, the second triangular wave signal S2 may be implemented to have a 180-degree phase difference with the first triangular wave signal S1. Therefore, the control signals P2 and P3 may be square waves having the same phase.

Switching duties of a plurality of transistors M1 to M4 included in the DC/DC converter 1100B may be adjusted by the generated control signals P1 to P4, and thus, the voltage Vcf corresponding to the difference between the voltage VDDM and the voltage VSSM may be controlled to VIN/2, thereby obtaining a desired output current TOUT. Accordingly, a constant current circuit for controlling an output current not to be changed may be implemented.

For example, circuits implemented as one semiconductor chip among the circuit elements configuring the power supply 1000B of FIG. 14 are referred to by CH2.

Figure 15:
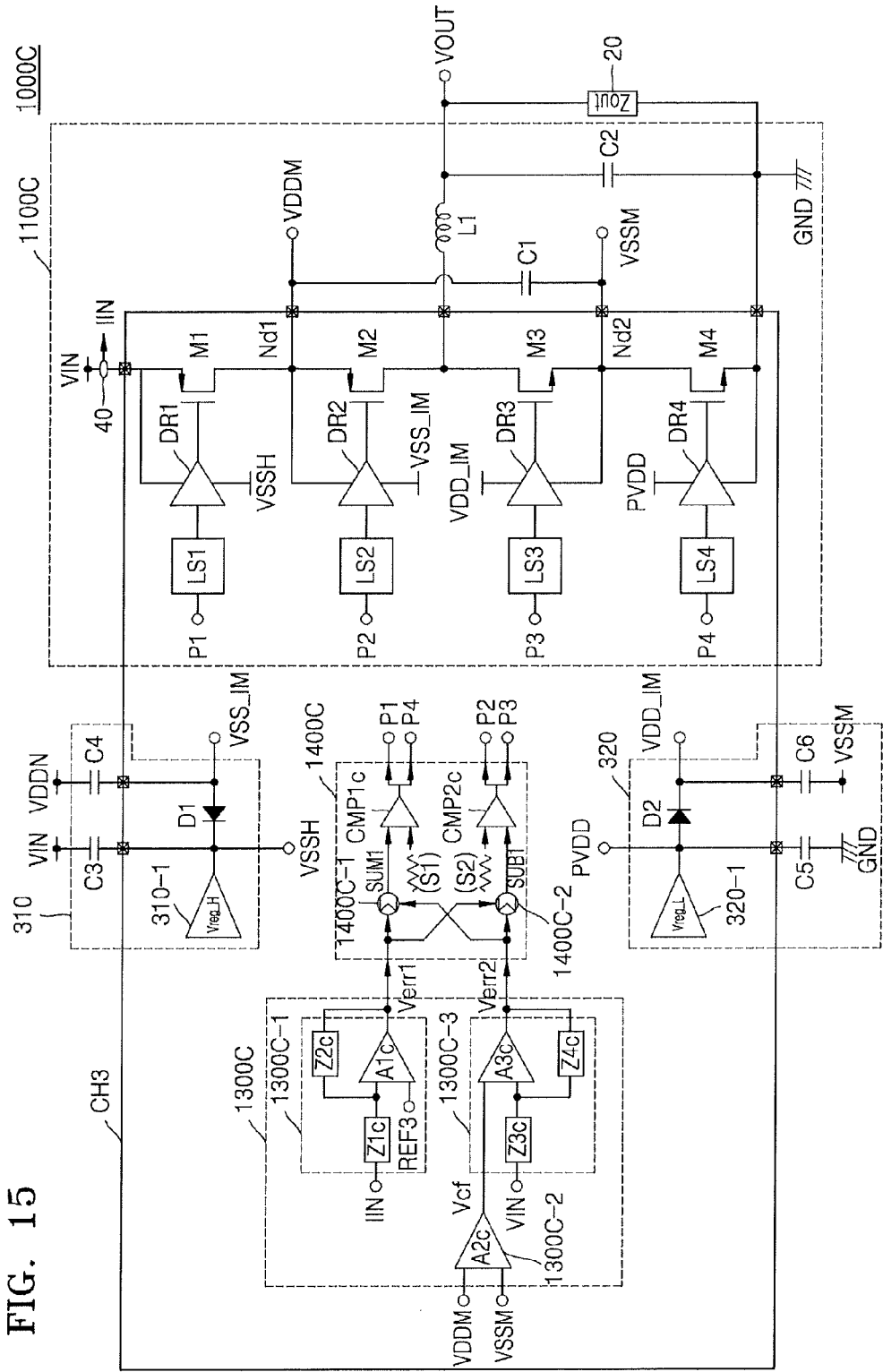
FIG. 15 is a diagram illustrating another example of a detailed circuit configuration of the power supply illustrated in FIG. 12.

FIG. 15 is a diagram illustrating another example 1000C of a detailed circuit configuration of the power supply 1000 illustrated in FIG. 12.

Referring to FIG. 15, a power supply 1000C may include a DC/DC converter 1100C, a feedback circuit 1300C, a controller 1400C, a high-side voltage regulator circuit 310, and a low-side voltage regulator circuit 320. For reference, a load circuit 20 which is connected between an output terminal and a ground terminal GND of the DC/DC converter 1100C is illustrated. FIG. 15 illustrates a circuit that controls an input current IIN to maintain a target current level.

The DC/DC converter 1100C may include a circuit configuration where the level shifters LS1 to LS4 of FIG. 7 are added into the DC/DC converter 300' illustrated in FIG. 6. In the DC/DC converter 1100C, a negative source voltage VSSH of a driver DR1 and a negative source voltage VSS_IM of a driver DR2 may be applied from the high-side voltage regulator circuit 310. Also, a positive source voltage PVDD of a driver DR4 and a positive source voltage VDD_IM of a driver DR3 may be applied from the low-side voltage regulator circuit 320.

The DC/DC converter 1100C may include a current sensor 40 that senses the input current IIN flowing from an input terminal IN to a transistor M1 of the DC/DC converter 1100C.

The feedback circuit 1300C may include first to third amplifier circuits 1300C-1 to 1300C-3. The input current IIN, a voltage VDDM, and a voltage VSSM may be input from the DC/DC converter 1100C to the feedback circuit 1300C. The voltage VDDM may be a voltage that is detected from a node Nd1 of the DC/DC converter 1100C, and the voltage VSSM may be a voltage that is detected from a node Nd2 of the DC/DC converter 1100C.

The first amplifier circuit 1300C-1 may be configured with an OP amplifier A1c and two impedances Z1c and Z2c. The first amplifier circuit 1300C-1 may amplify a difference between the input current RN and a reference source REF3 to output a first error signal Verr1, based on a gain value of the first amplifier circuit 1300C-1. A gain value of the first amplifier circuit 1300C-1 may be adjusted based on a ratio of the two impedances Z1c and Z2c.

The second amplifier circuit 1300C-2 may be configured with an OP amplifier A2c. The second amplifier circuit 1300C-2 may amplify the difference between the voltage VDDM and the voltage VSSM input from the DC/DC converter 1100C to output a voltage Vcf. For example, a gain value of the second amplifier circuit 1300C-2 may be set to 1.

The third amplifier circuit 1300C-3 may be configured with an OP amplifier A3c and two impedances Z3c and Z4c. The third amplifier circuit 1300C-3 may amplify a difference between an input voltage VIN of the DC/DC converter 1100C and the voltage Vcf output from the second amplifier circuit 1300C-2 to output a second error signal Verr2, based on a gain value of the third amplifier circuit 1300C-3. A gain value of the third amplifier circuit 1300C-3 may be adjusted based on a ratio of the two impedances Z3c and Z4c.

The first error signal Verr1 and the second error signal Verr2 generated by the feedback circuit 1300C may be output to the controller 1400C.

The controller 1400C may include an adder 1400C-1, a subtractor 1400C-2, and first and second comparators CMP1c and CMP2c.

The controller 1400C may compare an operational combination of the first and second error signals Verr1 and Verr2 with a triangular wave having a 180-degree phase difference with the operational combination to generate a plurality of control signals P1 to P4 as follows.

The adder 1400C-1 may summate a voltage of the first error signal Verr1 and a voltage of the second error signal Verr2 to generate a first signal SUM1. The subtractor 1400C-2 may generate a second signal SUB1 corresponding to a difference between the first error signal Veal and the second error signal Verr2. In detail, the subtractor 1400C-2 may subtract the voltage of the second error signal Verr2 from the voltage of the first error signal Verr1 to generate the second signal SUB1.

The first comparator CMP1c may compare a voltage level of the first signal SUM1 with a voltage level of a first triangular wave signal S1 and generate the control signals P1 and P4, based on a result of the comparison. Therefore, the control signals P1 and P4 may be square waves having the same phase.

The second comparator CMP2c may compare a voltage level of the second signal SUB1 with a voltage level of a second triangular wave signal S2 and generate the control signals P2 and P3, based on a result of the comparison. Here, the second triangular wave signal S2 may be implemented to have a 180-degree phase difference with the first triangular wave signal S1. Therefore, the control signals P2 and P3 may be square waves having the same phase.

Switching duties of a plurality of transistors M1 to M4 included in the DC/DC converter 1100C may be adjusted by the generated control signals P1 to P4, and thus, the voltage Vcf corresponding to the difference between the voltage VDDM and the voltage VSSM may be controlled to VIN/2, thereby obtaining a desired input current IIN. Accordingly, a constant power circuit for controlling input power not to be changed may be implemented.

For example, circuits implemented as one semiconductor chip among the circuit elements configuring the power supply 1000C of FIG. 15 are referred to by CH3.

Figure 16:
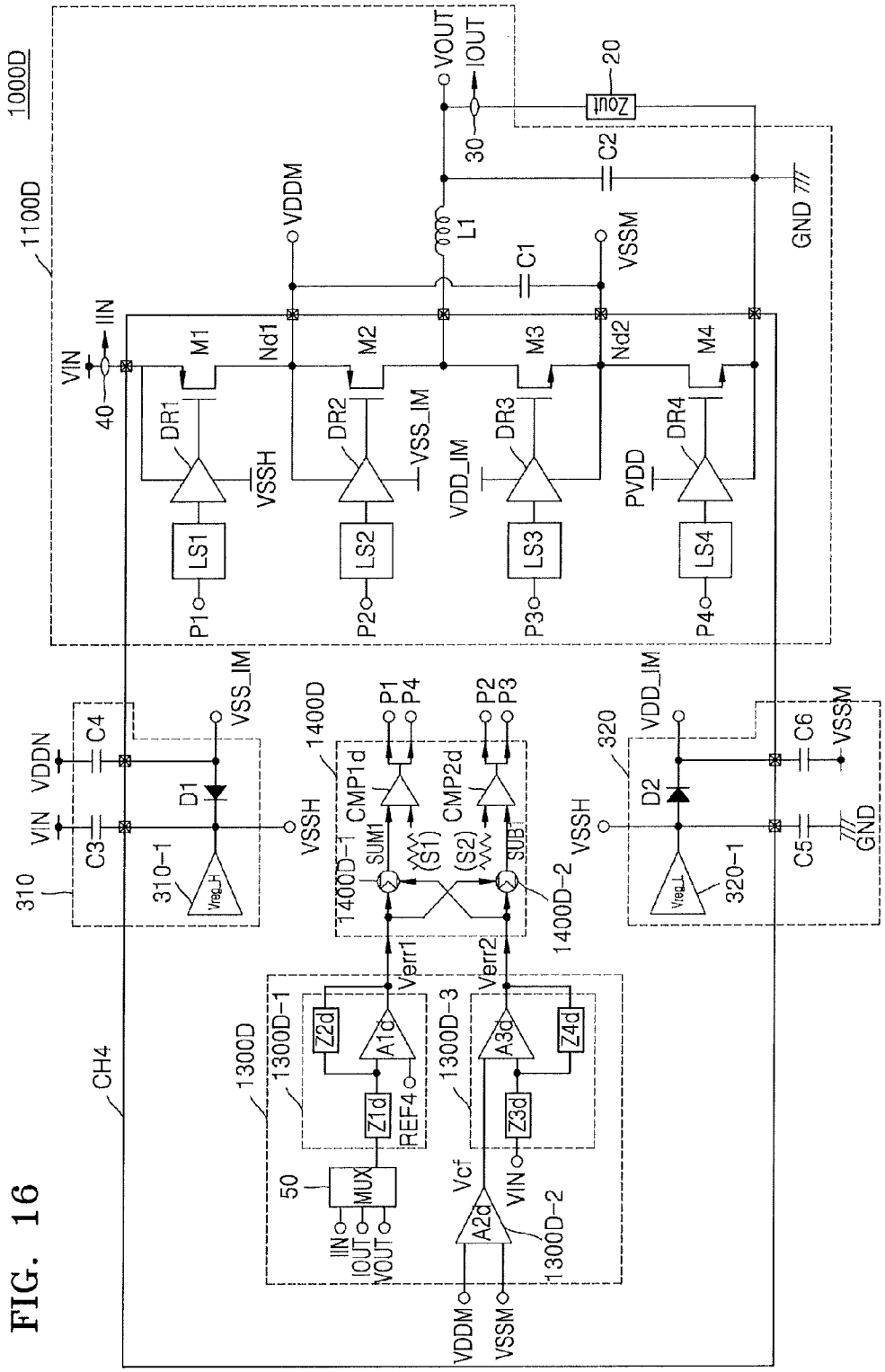
FIG. 16 is a diagram illustrating another example of a detailed circuit configuration of the power supply illustrated in FIG. 12.

FIG. 16 is a diagram illustrating another example 1000D of a detailed circuit configuration of the power supply 1000 illustrated in FIG. 12.

Referring to FIG. 16, a power supply 1000D may include a DC/DC converter 1100D, a feedback circuit 1300D, a controller 1400D, a high-side voltage regulator circuit 310, and a low-side voltage regulator circuit 320. For reference, a load circuit 20 which is connected between an output terminal and a ground terminal GND of the DC/DC converter 1100D is illustrated. FIG. 16 illustrates a circuit that controls an input current IIN to maintain a target level.

The DC/DC converter 1100D may include a circuit configuration where the level shifters LS1 to LS4 of FIG. 7 are added into the DC/DC converter 300' illustrated in FIG. 6. In the DC/DC converter 1100D, a negative source voltage VSSH of a driver DR1 and a negative source voltage VSS_IM of a driver DR2 may be applied from the high-side voltage regulator circuit 310. Also, a positive source voltage PVDD of a driver DR4 and a positive source voltage VDD_IM of a driver DR3 may be applied from the low-side voltage regulator circuit 320.

The DC/DC converter 1100D may include a current sensor 30 that senses an output current IOUT flowing from an output terminal OUT to the load circuit 20. The DC/DC converter 1100D may include a current sensor 40 that senses the input current IIN flowing from an input terminal IN to a transistor M1 of the DC/DC converter 1100D.

The feedback circuit 1300D may include a multiplexer 50 and first to third amplifier circuits 1300D-1 to 1300D-3. The input current IIN, the output current IOUT, an output voltage VOUT, a voltage VDDM, and a voltage VSSM may be input from the DC/DC converter 1100D to the feedback circuit 1300D. The voltage VDDM may be a voltage that is detected from a node Nd1 of the DC/DC converter 1100D, and the voltage VSSM may be a voltage that is detected from a node Nd2 of the DC/DC converter 1100D.

The multiplexer 50 may select a signal of one input terminal from among the input current TIN, the output current IOUT, and the output voltage VOUT input to an input terminal according to a selection signal SEL and output the selected signal to an output terminal.

The first amplifier circuit 1300D-1 may be configured with an OP amplifier A1d and two impedances Z1d and Z2d. The first amplifier circuit 1300D-1 may amplify a difference between one signal output from the multiplexer 50 and a reference source REF4 to output a first error signal Verr1, based on a gain value of the first amplifier circuit 1300D-1. When the input current IN or the output current IOUT is selected by the multiplexer 50, the selected current may be a reference current, and when the output voltage VOUT is selected, the selected voltage may be a reference voltage.

A gain value of the first amplifier circuit 1300D-1 may be adjusted based on a ratio of the two impedances Z1d and Z2d.

The second amplifier circuit 1300D-2 may be configured with an OP amplifier A2d. The second amplifier circuit 1300D-2 may amplify the difference between the voltage VDDM and the voltage VSSM input from the DC/DC converter 1100D to output a voltage Vcf. For example, a gain value of the second amplifier circuit 1300D-2 may be set to 1.

The third amplifier circuit 1300D-3 may be configured with an OP amplifier A3d and two impedances Z3d and Z4d. The third amplifier circuit 1300D-3 may amplify a difference between an input voltage VIN of the DC/DC converter 1100D and the voltage Vcf output from the second amplifier circuit 1300D-2 to output a second error signal Verr2, based on a gain value of the third amplifier circuit 1300D-3. A gain value of the third amplifier circuit 1300D-3 may be adjusted based on a ratio of the two impedances Z3d and Z4d.

The first error signal Verr1 and the second error signal Verr2 generated by the feedback circuit 1300D may be output to the controller 1400D.

The controller 1400D may include an adder 1400D-1, a subtractor 1400D-2, and first and second comparators CMP1d and CMP2d.

The controller 1400D may compare an operational combination of the first and second error signals Verr1 and Verr2 with a triangular wave having a 180-degree phase difference with the operational combination to generate a plurality of control signals P1 to P4 as follows.

The adder 1400D-1 may summate a voltage of the first error signal Verr1 and a voltage of the second error signal Verr2 to generate a first signal SUM1. The subtractor 1400D-2 may generate a second signal SUB1 corresponding to a difference between the first error signal Verr1 and the second error signal Verr2. In detail, the subtractor 1400D-2 may subtract the voltage of the second error signal Verr2 from the voltage of the first error signal Verr1 to generate the second signal SUB1.

The first comparator CMP1d may compare a voltage level of the first signal SUM1 with a voltage level of a first triangular wave signal S1 and generate the control signals P1 and P4, based on a result of the comparison. Therefore, the control signals P1 and P4 may be square waves having the same phase.

The second comparator CMP2d may compare a voltage level of the second signal SUB1 with a voltage level of a second triangular wave signal S2 and generate the control signals P2 and P3, based on a result of the comparison. Here, the second triangular wave signal S2 may be implemented to have a 180-degree phase difference with the first triangular wave signal S1. Therefore, the control signals P2 and P3 may be square waves having the same phase.

Switching duties of a plurality of transistors M1 to M4 included in the DC/DC converter 1100C may be adjusted by the generated control signals P1 to P4, and thus, the voltage Vcf corresponding to the difference between the voltage VDDM and the voltage VSSM may be controlled to VIN/2, thereby obtaining a desired input current IIN, a desired output current IOUT, or a desired output voltage VOUT. Accordingly, a constant current circuit that controls the input current IIN not to be changed according to a signal selected by the multiplexer 50 may be implemented, or a constant voltage circuit that controls the output voltage VOUT not to be changed according to a signal selected by the multiplexer 50 may be implemented.

Figure 17:
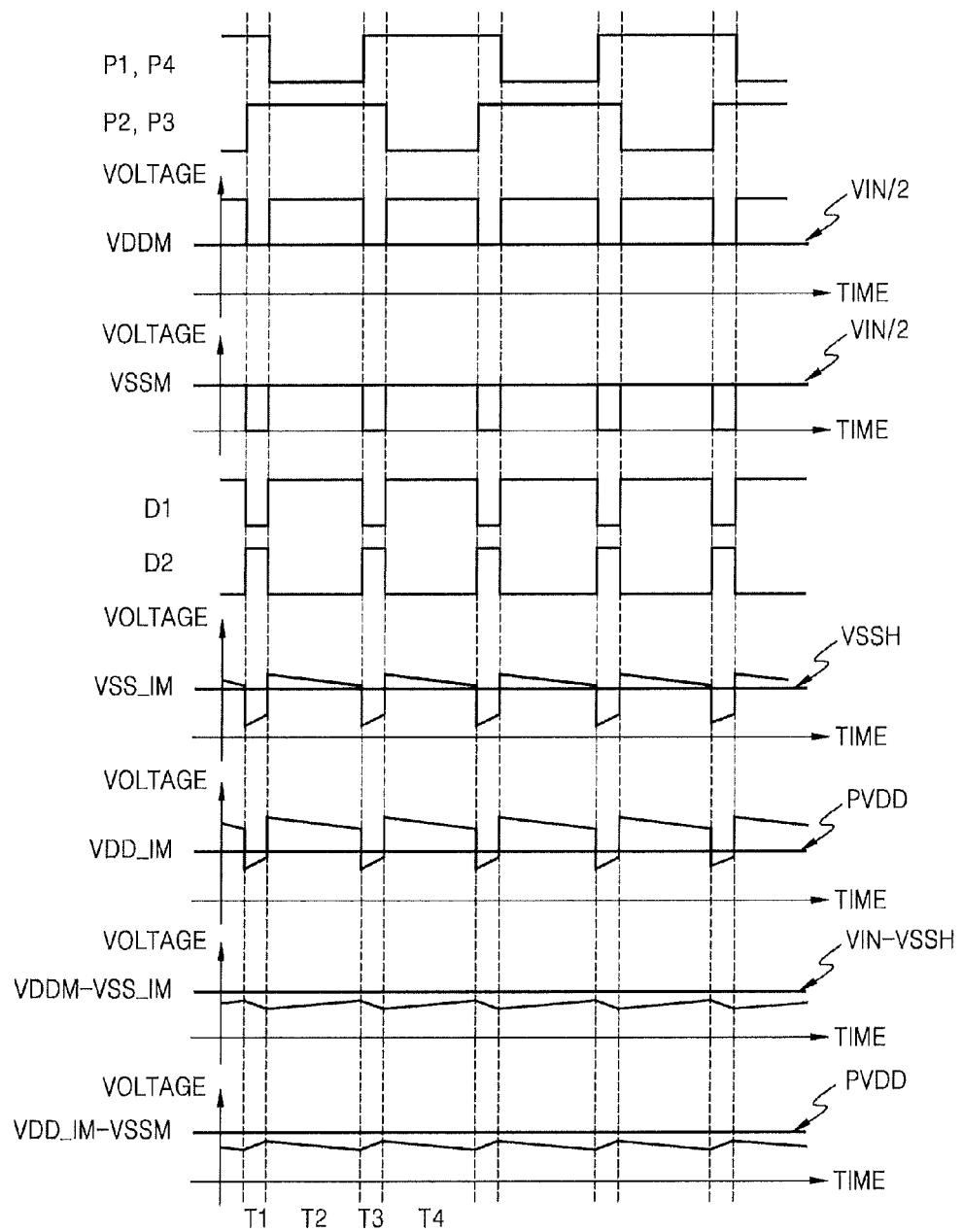
FIG. 17 shows an example of waveforms of main signals of a DC/DC converter and a power supply according to an exemplary embodiment.

FIG. 17 shows an example of waveforms of main signals of the DC/DC converter 300 (300') and the power supply 1000A (1000B to 1000D) according to an exemplary embodiment. FIG. 17 shows waveforms of main signals when duties of the control signals P2 and P3 are equal to or lower than 0.5.

In T1 and T3 sections, since the control signals P1 and P4 are in a high state and the control signals P2 and P3 are in a high state, the transistors M1 and M2 may be turned off, and the transistors M3 and M4 may be turned on. Therefore, the voltage VDDM may become VIN/2, and the voltage VSSM may become 0 V. Accordingly, a current may flow from the output terminal OUT to the ground terminal GND through the inductor L1 and the transistors M3 and M4.

In a T2 section, since the control signals P1 and P4 are in a low state and the control signals P2 and P3 are in a high state, the transistors M1 and M3 may be turned on, and the transistors M2 and M4 may be turned off. Therefore, the voltage VDDM may become VIN, and the voltage VSSM may become VIN/2.

In a T4 section, since the control signals P1 and P4 are in a high state and the control signals P2 and P3 are in a low state, the transistors M1 and M3 may be turned off, and the transistors M2 and M4 may be turned on. Therefore, the voltage VDDM may become VIN, and the voltage VSSM may become VIN/2.

Referring to FIG. 10, in the T2 and T4 sections, when the voltage VSSM becomes 0 V and the voltage VDD_IM is lower than the voltage PVDD, the diode D2 may be turned on, and thus, the voltage VDD_IM may be charged to "PVDD−VD". Here, VD is a diode forward voltage.

Figure 18:
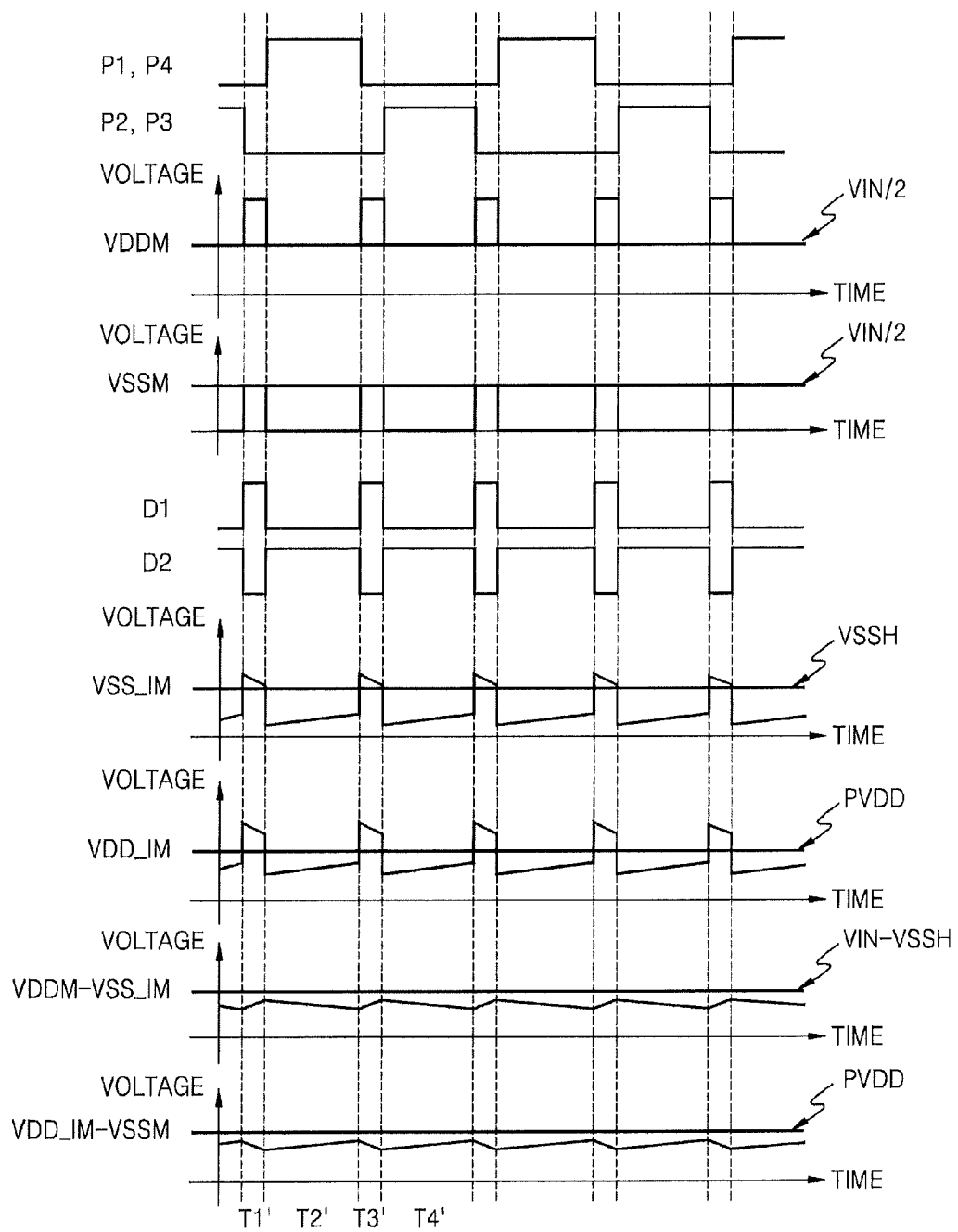
FIG. 18 shows another example of waveforms of main signals of a DC/DC converter and a power supply according to an exemplary embodiment.

FIG. 18 shows another example of waveforms of main signals of the DC/DC converter 300 (300') and the power supply 1000A (1000B to 1000D) according to an exemplary embodiment. FIG. 18 shows waveforms of main signals when duties of the control signals P2 and P3 are equal to or higher than 0.5.

In T1' and T3' sections, since the control signals P1 and P4 are in a low state and the control signals P2 and P3 are in a low state, the transistors M1 and M2 may be turned on, and the transistors M3 and M4 may be turned off. Therefore, the voltage VDDM may become VIN, and the voltage VSSM may become VIN/2. Accordingly, a current may flow from the input terminal IN to the output terminal OUT through the transistors M1 and M2 and the inductor L1.

In a T2' section, since the control signals P1 and P4 are in a high state and the control signals P2 and P3 are in a low state, the transistors M1 and M3 may be turned off, and the transistors M2 and M4 may be turned on. Therefore, the voltage VDDM may become VIN/2, and the voltage VSSM may become 0 V.

In a T4' section, since the control signals P1 and P4 are in a low state and the control signals P2 and P3 are in a high state, the transistors M1 and M3 may be turned on, and the transistors M2 and M4 may be turned off. Therefore, the voltage VDDM may become VIN/2, and the voltage VSSM may become 0 V.

Referring to FIG. 10, in the T1' and T3' sections, when the voltage VSSM becomes VIN and the voltage VSS_IM is higher than the voltage VSSH, the diode D1 may be turned on, and thus, the voltage VSS_IM may be discharged to "VSSH+VD". Here, VD is a diode forward voltage.

Referring to FIG. 11, in the T2' and T4' sections, when the voltage VSSM becomes 0 V and the voltage VDD_IM is lower than the voltage PVDD, the diode D2 may be turned on, and thus, the voltage VDD_IM may be charged to "PVDD−VD". Here, VD is a diode forward voltage.

Since the DC/DC converter 300 (300') is driven with the source voltages of the drivers generated by the high-side voltage regulator circuit 310 and the low-side voltage regulator circuit 320 as illustrated in FIGS. 10 and 11, a correlation between the driving voltage and the input voltage of the drivers is eliminated. Therefore, even when an input voltage applied to an input terminal is high, a plurality of power switches (for example, the transistors M1 to M4) are turned on with a constant voltage. Therefore, the power switches have a constant conduction resistance irrespective of the input voltage, and thus, stable switching operations of the power switches are performed. That is, even when the input voltage is low, the power switches operate by using a low conduction resistance.

Figure 19:
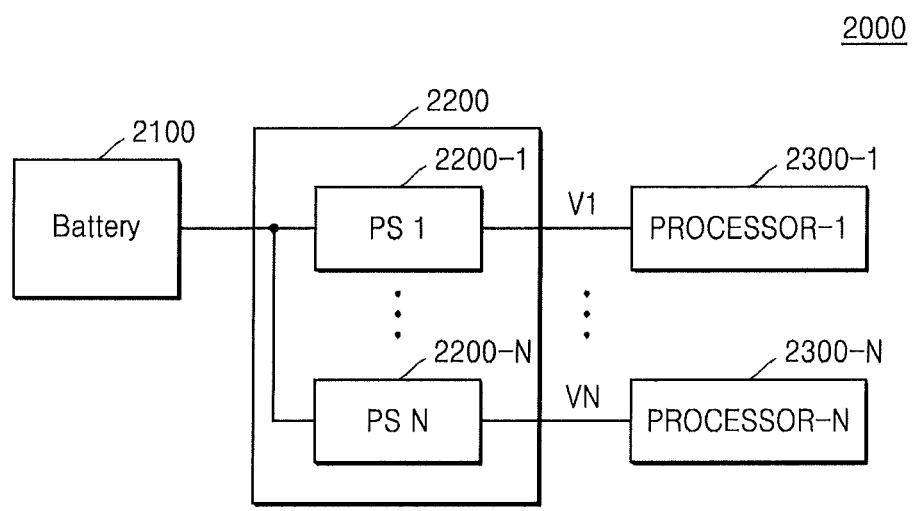
FIG. 19 illustrates an example of a configuration of an electronic device to which a power supply according to an exemplary embodiment is applied.

FIG. 19 illustrates an example of a configuration of an electronic device 2000 to which the power supply according to an exemplary embodiment is applied.

Referring to FIG. 19, the electronic device 2000 may include a battery 2100, a power management circuit 2200, and first to Nth processors 2300-1 to 2300-N (where N is an integer equal to or more than two).

The electronic device 2000 may include, for example, a personal computer (PC), a mobile terminal, a personal digital assistant (PDA), a portable multimedia player (PMP), an MP3 player, a camera, a camcorder, a television (TV), a display apparatus, and/or the like.

The battery 2100 may supply DC power to the electronic device 2000. For example, the battery 2100 may generate a DC voltage "$V_{BAT}$" and output the DC voltage to the power management circuit 2200.

The power management circuit 2200 may include a plurality of power supplies 2200-1 to 2200-N. Each of the plurality of power supplies 2200-1 to 2200-N may use the power supply 1000 illustrated in FIG. 12. For example, each of the plurality of power supplies 2200-1 to 2200-N may use one or more of the power supplies 1000A to 1000D illustrated in FIGS. 13 to 16. The plurality of power supplies 2200-1 to 2200-N may generate different voltages V1 to VN.

The first to Nth processors 2300-1 to 2300-N may operate with respective voltages generated by the plurality of power supplies 2200-1 to 2200-N. For example, the first to Nth processors 2300-1 to 2300-N may be a baseband processor, an application processor, and/or the like.

Figure 20:
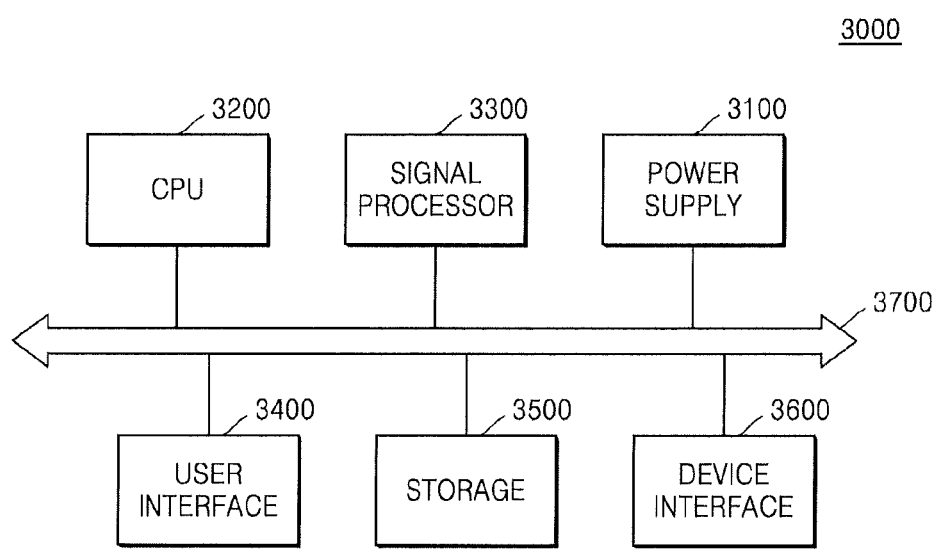
FIG. 20 illustrates another example of a configuration of an electronic device to which a power supply according to an exemplary embodiment is applied.

As illustrated in FIG. 20, an electronic device 3000 may include a power supply 3100, a central processing unit (CPU) 3200, a signal processor 3300, a user interface 3400, a storage 3500, a device interface 3600, and a bus 3700.

The electronic device 3000 may include, for example, a PC, a mobile terminal, a PDA, a PMP, an MP3 player, a camera, a camcorder, a TV, a display apparatus, and/or the like.

The power supply 3100 may generate a source voltage necessary for the electronic device 3000 and supply the source voltage to a plurality of elements. The power supply 3100 may use the power supply 1000 according to an exemplary embodiment. For example, the power supply 3100 may use one or more of the power supplies 1000A to 1000D illustrated in FIGS. 13 to 16.

The CPU 3200 may overall control the electronic device 3000. For example, the CPU 3200 may control the elements of the electronic device 3000, based on information input through the user interface 3400.

The signal processor 3300 may process a signal received through the device interface 3600 or a signal read from the storage 3500 according to the defined standard. For example, the signal processor 3300 may perform video signal processing, audio signal processing, and/or the like.

The user interface 3400 may be an input unit that is used for a user to set information necessary for a function setting and an operation of the electronic device 3000.

The storage 3500 may store various pieces of information necessary for an operation of the electronic device 3000. Also, the storage 3500 may store data received through the device interface 3600 or pieces of data obtained through processing by the electronic device 3000.

The device interface 3600 may perform data communication with an external device which is connected to the electronic device 300 by wire or wirelessly.

The bus 3700 may transmit information between the elements of the electronic device 3000.

While the inventive concepts have been particularly shown and described with reference to exemplary embodiments thereof, it will be understood that various changes in form and details may be made therein without departing from the spirit and scope of the following claims.

What is claimed is:

1. A DC/DC converter comprising:
a plurality of power switches connected as a serial string between an input terminal and a ground terminal;
a first capacitor connected to at least two power switches of the serial string in parallel;
an inductor connected between an intermediate node of the serial string and an output terminal;
a second capacitor connected between the output terminal and the ground terminal;
a plurality of drivers configured to generate a switching control signal to control each of the plurality of power switches; and
a plurality of level shifters configured to shift voltage levels of control signals to drive the drivers,
wherein the plurality of power switches comprise a plurality of high-side power switches connected between the input terminal and the intermediate node of the serial string, and a plurality of low-side power switches connected between the intermediate node of the serial string and the ground terminal, and
wherein
the plurality of drivers comprise a plurality of high-side drivers configured to respectively generate switching control signals for the plurality of high-side power switches, and a plurality of low-side drivers configured to respectively generate switching control signals for the plurality of low-side power switches, and
a first source voltage supplied to at least one driver of the plurality of high-side drivers and a second source voltage supplied to at least one driver of the plurality of low-side drivers are constant voltages that are different from each other.

2. The DC/DC converter of claim 1, wherein
the first capacitor is connected between a first node and a second node of the serial string,
the first node is positioned between the intermediate node of the serial string and the input terminal, and
the second node is positioned between the intermediate node of the serial string and the ground terminal.

3. The DC/DC converter of claim 1, wherein the plurality of high-side power switches comprise a plurality of p-type metal-oxide-semiconductor (PMOS) transistors, and the plurality of low-side power switches comprise a plurality of n-type metal-oxide-semiconductor (NMOS) transistors.

4. The DC/DC converter of claim 1, wherein
the first source voltage is a negative source voltage and
the second source voltage is a positive source voltage.

5. The DC/DC converter of claim 4, wherein, the negative source voltage supplied to at least one driver of the plurality of high-side drivers is determined as a constant voltage that is lower than a voltage obtained by subtracting a source-gate voltage, which is used to turn on at least one of the plurality of high-side PMOS transistors, from a voltage of the input terminal.

6. The DC/DC converter of claim 4, wherein the positive source voltage supplied to at least one driver of the plurality of low-side drivers is determined as a constant voltage which is higher than a voltage obtained by adding a gate-source voltage, which is used to turn on at least one of the plurality of low-side NMOS transistors, to a voltage of the ground terminal.

7. The DC/DC converter of claim 1, wherein
the plurality of power switches comprise a first PMOS transistor, a second PMOS transistor, a first NMOS transistor, and a second NMOS transistor,
a source terminal of the first PMOS transistor is connected to the input terminal, a drain terminal of the first PMOS transistor is connected to a first node, a source terminal of the second PMOS transistor is connected to the first node, a drain terminal of the second PMOS transistor is connected to the intermediate node, a drain terminal of the first NMOS transistor is connected to the intermediate node, a source terminal of the first NMOS transistor is connected to a second node, a drain terminal of the second NMOS transistor is connected to the second node, and a source terminal of the second NMOS transistor is connected to the ground terminal,
the first capacitor is connected between the first node and the second node, and
the plurality of drivers comprise first to fourth drivers configured to respectively generate gate control signals for the first and second PMOS transistors and the first and second NMOS transistors.

8. The DC/DC converter of claim 7, wherein
a positive source voltage terminal of the first driver is connected to the input terminal,
a first constant voltage is supplied to a negative source voltage terminal of the first driver, and
the first constant voltage is determined as a constant voltage that is lower than a voltage obtained by subtracting a source-gate voltage, which is used to turn on the first PMOS transistor, from a voltage of the input terminal.

9. The DC/DC converter of claim 7, wherein
a positive source voltage terminal of the second driver is connected to the first node,
a third capacitor is connected between the positive source voltage terminal of the second driver and the first node, and
a first diode is connected between the positive source voltage terminal of the second driver and a negative source voltage terminal of the first driver.

10. The DC/DC converter of claim 7, wherein
a fourth capacitor is connected between a positive source voltage terminal of the third driver and the second node,
a second diode is connected between the positive source voltage terminal of the third driver and a positive source voltage terminal of the fourth driver, and
a negative source voltage terminal of the third driver is connected to the second node.

11. The DC/DC converter of claim 7, wherein
a second constant voltage is supplied to a positive source voltage terminal of the fourth driver, and
the second constant voltage is determined as a constant voltage that is higher than a voltage obtained by adding a gate-source voltage, which is used to turn on the second NMOS transistor, from a voltage of the ground terminal.

12. A power supply comprising:
a feedback circuit configured to generate a first error signal and a second error signal, based on a difference between at least two feedback signals and at least one reference source;
a controller configured to generate a plurality of control signals for making one of an output voltage, an output current, and an input current converge on a target value, based on the first error signal and the second error signal; and
a DC/DC converter configured to change a path of a current, flowing to at least one inductor and capacitor which are included in a circuit between an input terminal and an output terminal, to generate the output voltage and the at least two feedback signals, based on the plurality of control signals, the DC/DC converter including a plurality of power switches connected as a serial string between the input terminal and a ground terminal and a plurality of drivers configured to generate a switching control signal for each of the plurality of power switches,
wherein each of the power switches have a constant conduction resistance irrespective of an input voltage of the input terminal, and
wherein the feedback circuit comprises:
a first amplifier configured to generate the first error signal;
a second amplifier configured to generate a first signal corresponding to a voltage difference between a first node and a second node included in the serial string; and
a third amplifier configured to generate the second error signal corresponding to a voltage difference between the first signal and the input voltage applied to the input terminal.

13. The power supply of claim 12, wherein the
first amplifier is configured to generate the first error signal corresponding to a difference between the reference source and the output voltage detected from the output terminal.

14. The power supply of claim 12, wherein the
first amplifier is configured to generate the first error signal corresponding to a difference between the reference source and the output current detected between the output terminal and a load circuit.

15. The power supply of claim 12, wherein the
first amplifier configured to generate the first error signal corresponding to a difference between the reference source and the input current detected from the input terminal.

16. The power supply of claim 12, wherein the controller comprises:
an adder configured to generate a first signal corresponding to a sum of the first error signal and the second error signal;
a subtractor configured to generate a second signal corresponding to a difference between the first error signal and the second error signal;
a first comparator configured to compare the first signal with a first triangular wave signal to generate a first control signal and a fourth control signal; and
a second comparator configured to compare the second signal with a second triangular wave signal to generate a second control signal and a third control signal, the first triangular wave signal having a 180-degree phase difference with the second triangular wave signal.

17. The power supply of claim 12, further comprising a plurality of level shifters configured to respectively shift levels of the plurality of control signals,
wherein
output signals of the plurality of level shifters are respectively supplied to input terminals of the plurality of drivers, and
a source voltage of each of the plurality of level shifters is applied as a source voltage that is the same as a source voltage of a corresponding driver.

18. The power supply of claim 12, further comprising a regulator circuit configured to generate a source voltage supplied to at least one driver of the plurality of drivers,
wherein
the regulator circuit comprises:
a first voltage regulator configured to generate a first source voltage through a first terminal;
a second voltage regulator configured to generate a second source voltage through a second terminal;
a third capacitor connected between the first terminal and the input terminal;
a first diode connected between the first terminal and a third node;
a fourth capacitor connected between the third node and a first node included in the serial string;
a fifth capacitor connected between the second terminal and the ground terminal;
a second diode connected between the second terminal and a fourth node; and
a sixth capacitor connected between the fourth node and a second node included in the serial string, and
the first terminal is connected to a negative source voltage terminal of a first driver, the second terminal is connected to a positive source voltage terminal of a fourth driver, the third node is connected to a negative source voltage terminal of a second driver, and the fourth node is connected to a positive source voltage terminal of a third driver.

19. The power supply of claim 18, wherein the plurality of power switches comprise a first PMOS transistor, a second PMOS transistor, a first NMOS transistor, and a second NMOS transistor, a source terminal of the first PMOS transistor is connected to the input terminal, a drain terminal of the first PMOS transistor is connected to the first node, a source terminal of the second PMOS transistor is connected to the first node, a drain terminal of the second PMOS transistor is connected to an intermediate node, a drain terminal of the first NMOS transistor is connected to the intermediate node, a source terminal of the first NMOS transistor is connected to a second node, a drain terminal of the second NMOS transistor is connected to the second node, and a source terminal of the second NMOS transistor is connected to the ground terminal, a positive source voltage terminal of the first driver is connected to the input terminal, a positive source voltage terminal of the second driver is connected to the first node, a negative source voltage terminal of the third driver is connected to the second node, and a negative source voltage terminal of the fourth driver is connected to the ground terminal, and output terminals of the first to fourth drivers are respectively connected to gate terminals of the first and second PMOS transistors and the first and second NMOS transistors.

20. A method of driving a DC/DC converter including a plurality of power switches that are connected as a serial string between an input terminal and a ground terminal and comprise a first PMOS transistor, a second PMOS transistor, a first NMOS transistor, and a second NMOS transistor, the method comprising:

supplying a positive source voltage of a first driver, which is used to drive the first PMOS transistor, from a source terminal of the first PMOS transistor and supplying a first constant voltage as a negative source voltage of the first driver;

supplying a positive source voltage of a second driver, which is used to drive the second PMOS transistor, from a source terminal of the second PMOS transistor and supplying a negative source voltage of the second driver from a node located between a first diode and a first capacitor in a circuit where the first diode and the first capacitor are serially connected between a negative source voltage terminal of the first driver and a source terminal of the second PMOS transistor;

supplying a second constant voltage as a positive source voltage of a fourth driver for driving the second NMOS transistor, and supplying a ground voltage as a negative source voltage of the fourth driver; and supplying a positive source voltage of a third driver, which is used to drive the first NMOS transistor, from a node located between a second diode and a second capacitor in a circuit where the second diode and the second capacitor are serially connected between a positive source voltage terminal of the fourth driver and a drain terminal of the first NMOS transistor, wherein output terminals of the first to fourth drivers are respectively connected to gate terminals of the first PMOS transistor, the second PMOS transistor, the first NMOS transistor, and the second NMOS transistor, and a signal for controlling switching of the first PMOS transistor, the second PMOS transistor, the first NMOS transistor, and the second NMOS transistor is applied to an input terminal of each of the first to fourth drivers.

\* \* \* \* \*